INVENTORS.
ALFRED A. BARNES
ROBERT SPURR
BY
Bodell & Thompson
ATTORNEYS

INVENTORS.
ALFRED A. BARNES
ROBERT SPURR
BY Bodell & Thompson
ATTORNEYS

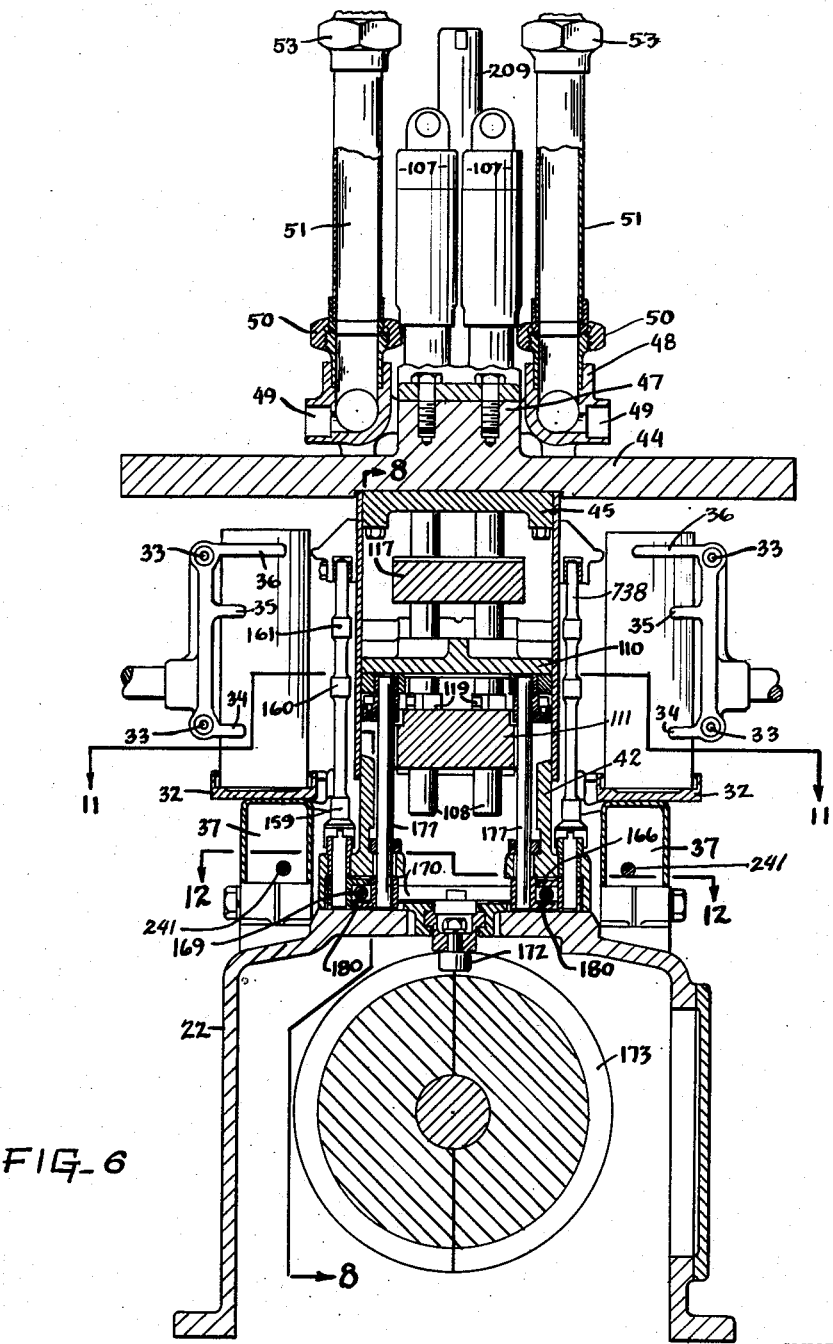

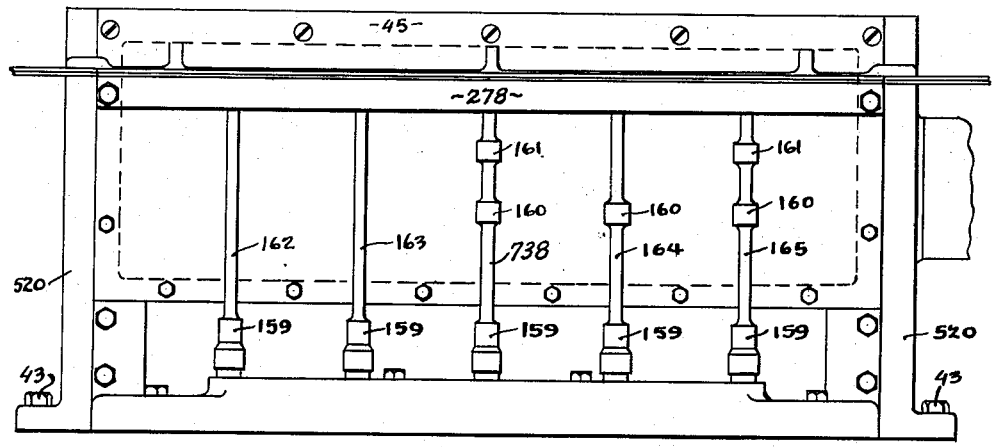
FIG_7
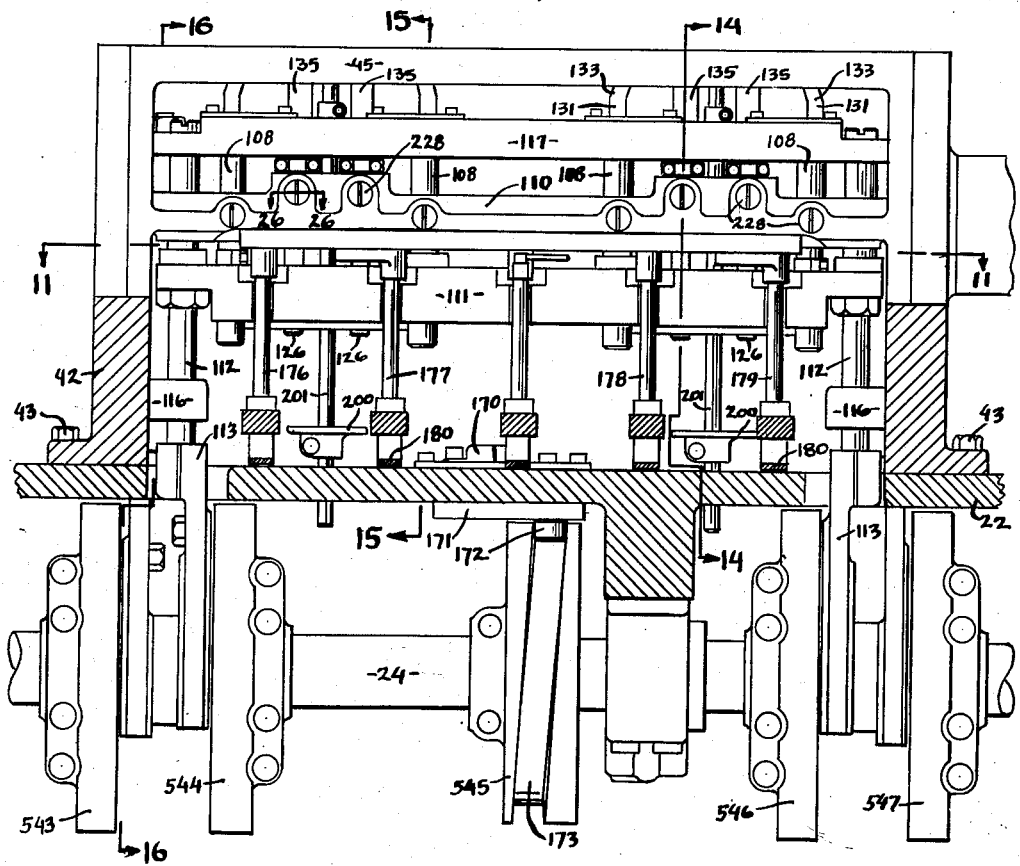
FIG_8
INVENTORS.
ALFRED A. BARNES
ROBERT SPURR
BY
Bodell & Thompson
ATTORNEYS

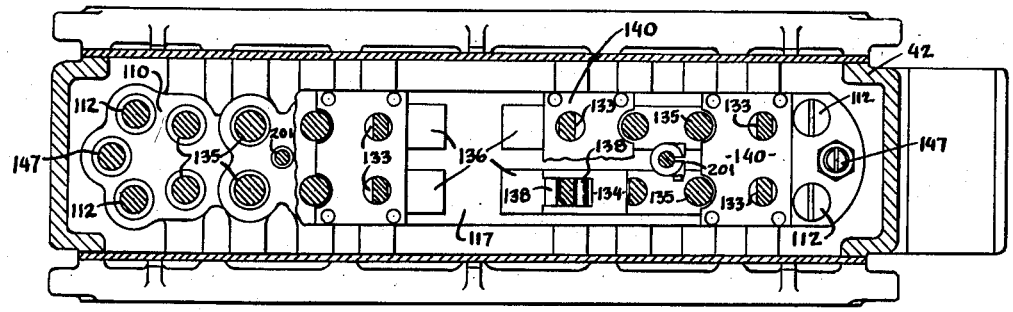

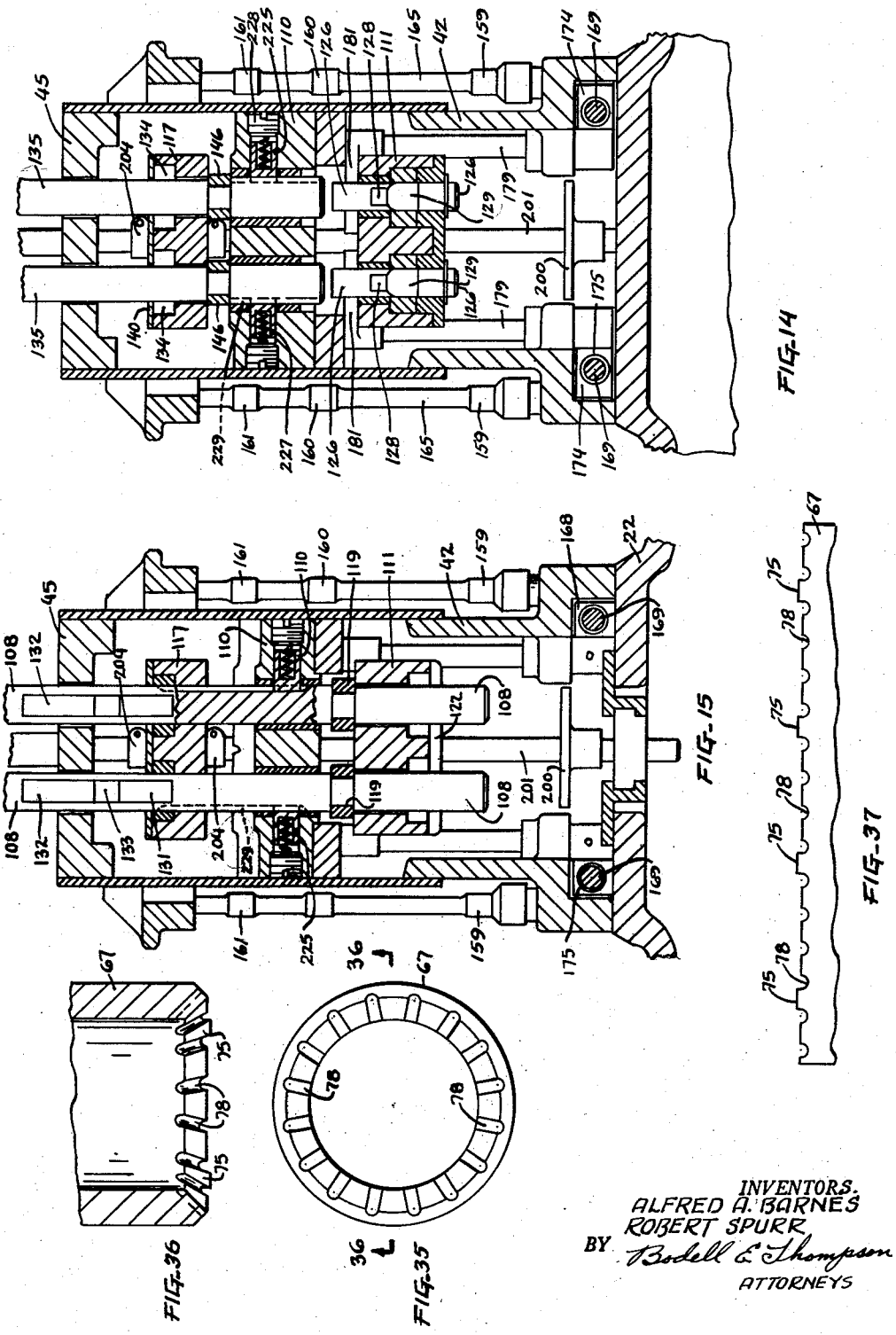

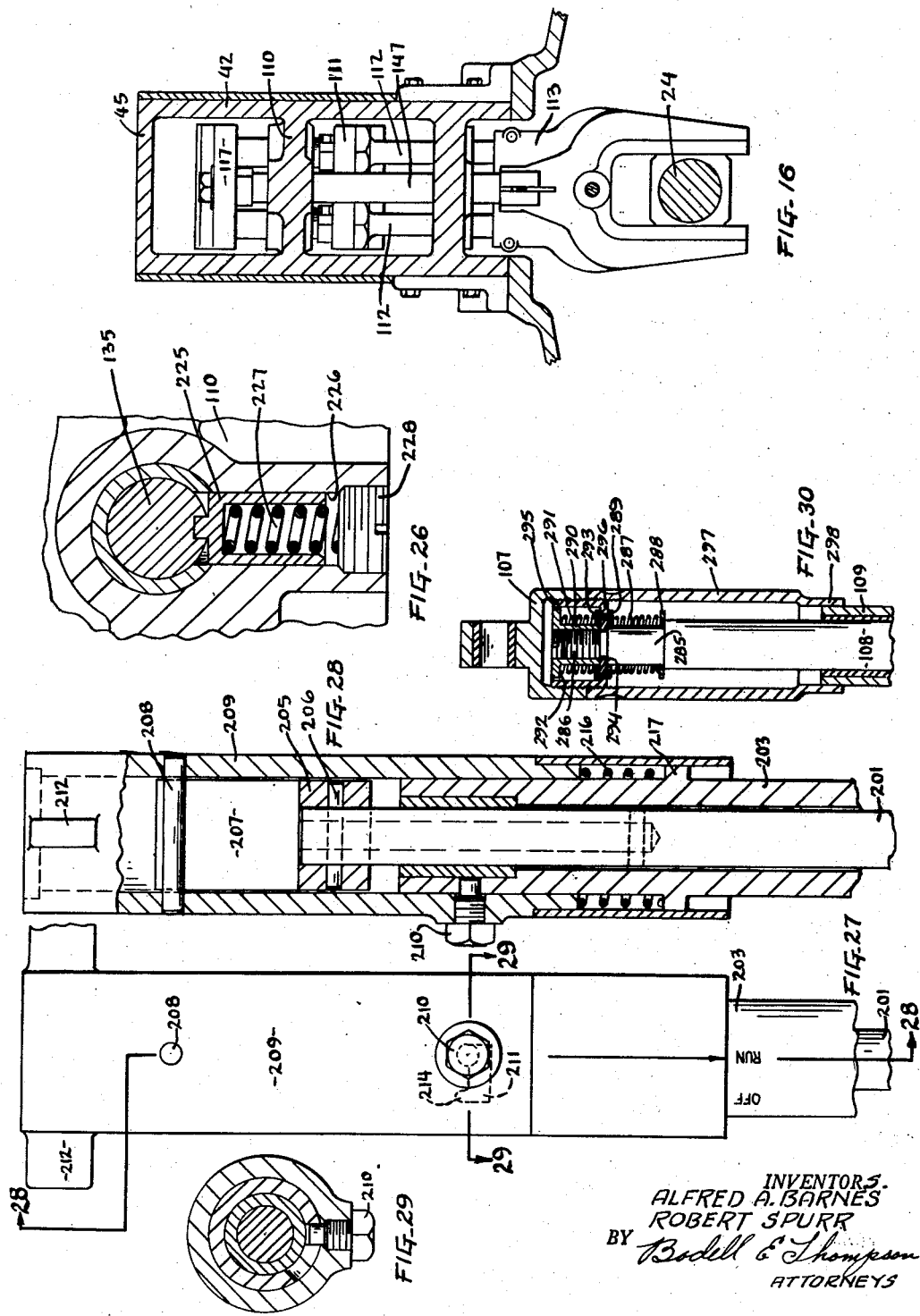

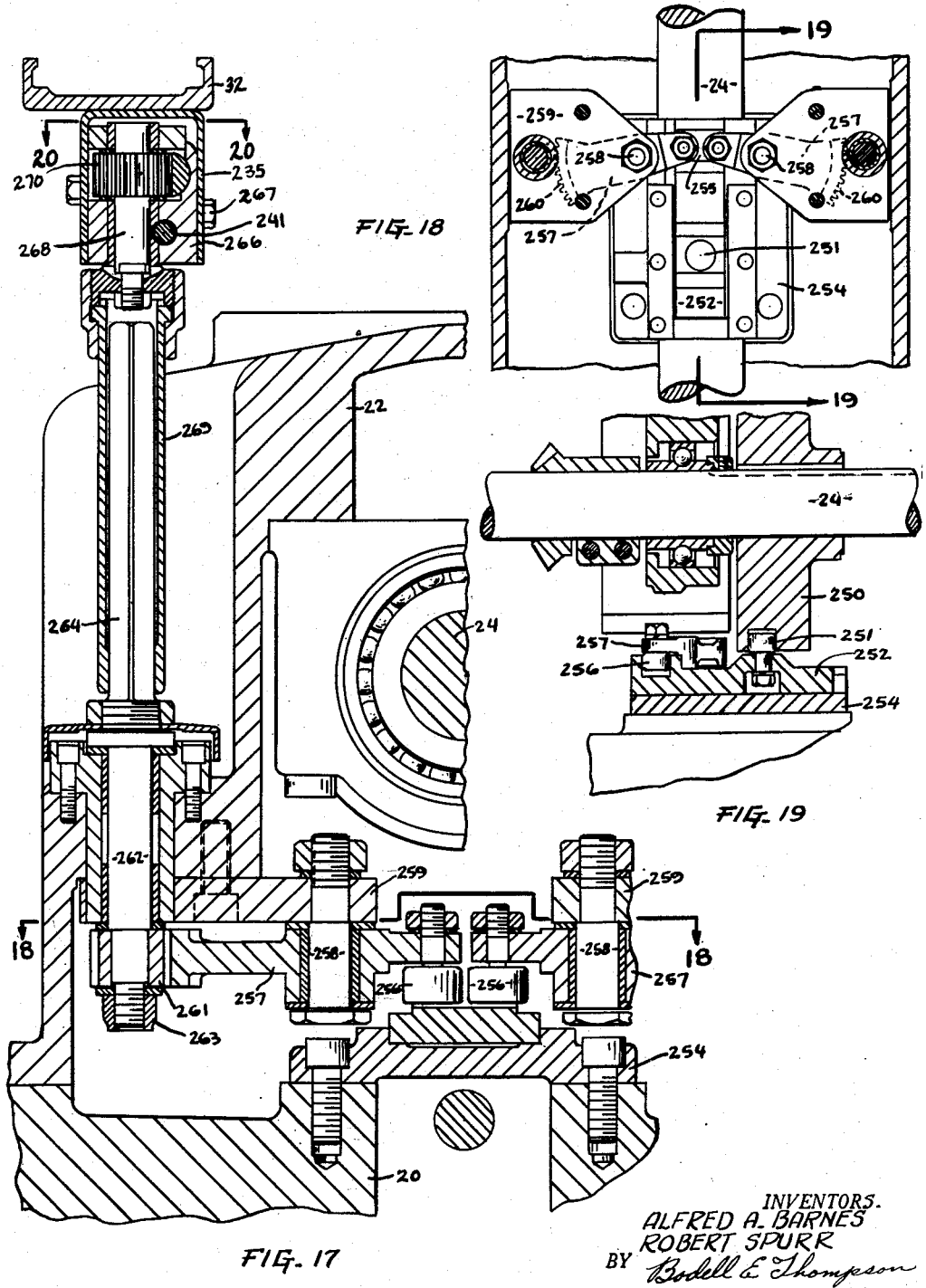

Jan. 19, 1954　　　A. A. BARNES ET AL　　　2,666,565
MECHANISM FOR FILLING CARTONS
Filed June 3, 1948　　　　　　　　　　　　　　13 Sheets-Sheet 12
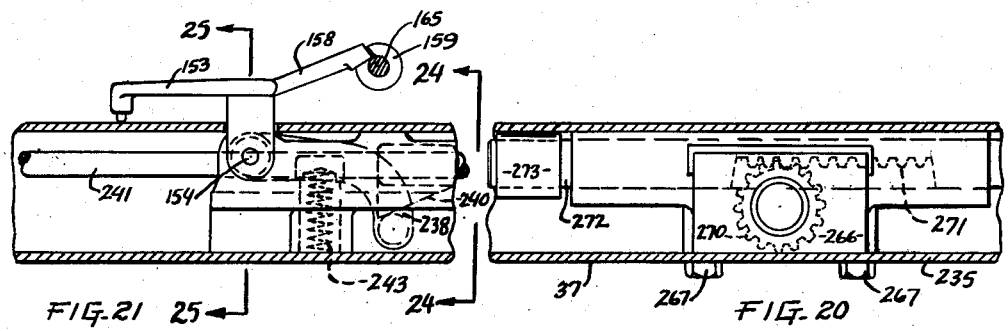
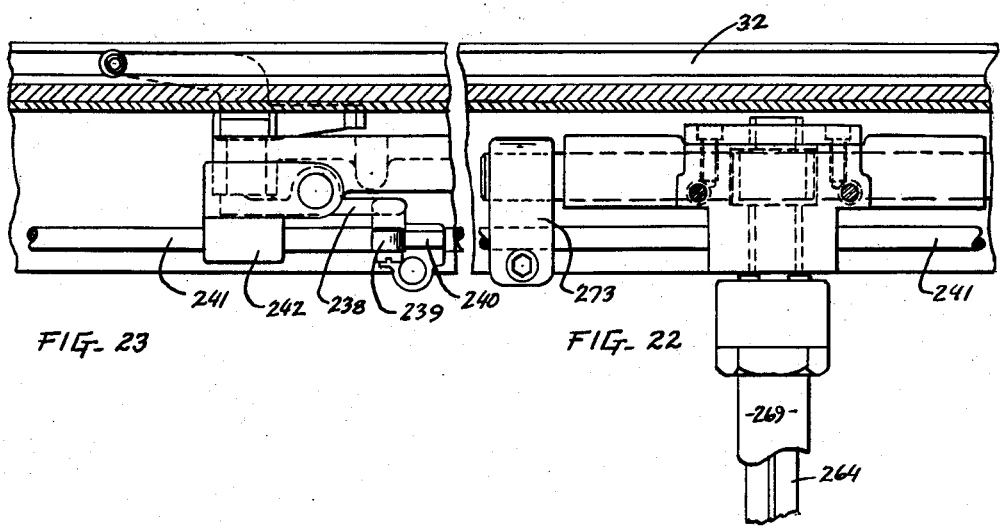
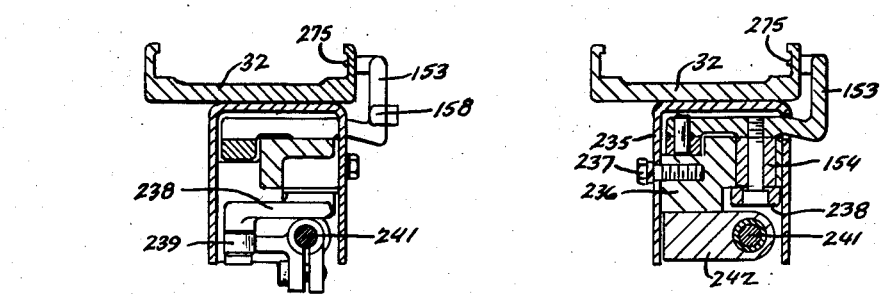
INVENTORS.
ALFRED A. BARNES
ROBERT SPURR
BY Bodell & Thompson
ATTORNEYS

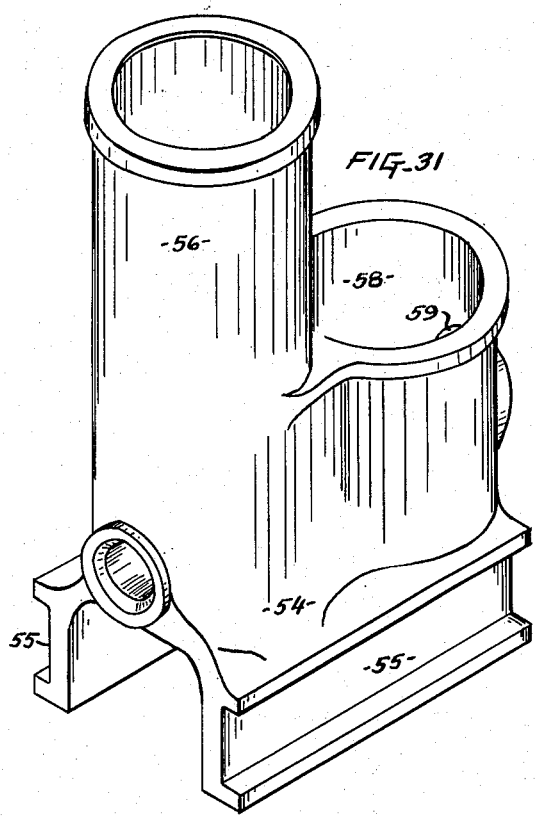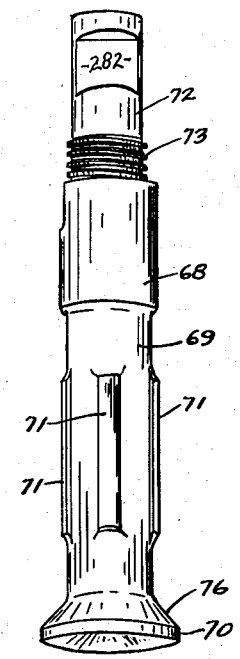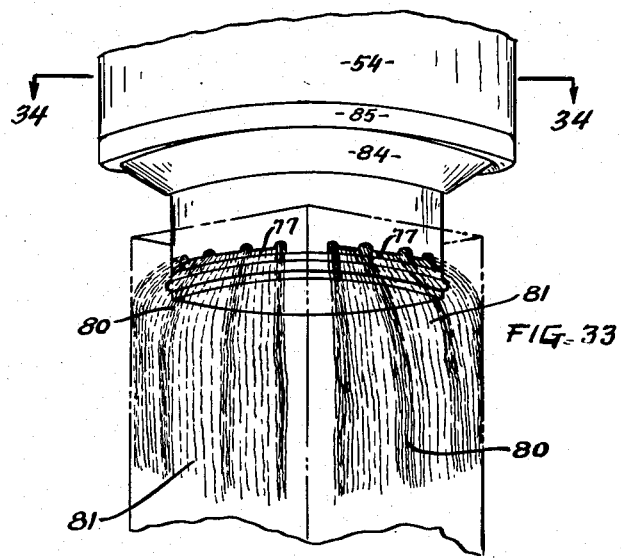

Patented Jan. 19, 1954

2,666,565

UNITED STATES PATENT OFFICE 2,666,565

MECHANISM FOR FILLING CARTONS

Alfred A. Barnes and Robert Spurr, Syracuse, N. Y., assignors to Oswego Falls Corporation, Fulton, N. Y., a corporation of New York Application June 3, 1948, Serial No. 30,774

36 Claims. (Cl. 226—99)

This invention relates to apparatus for filling open-ended cartons with liquid materials. More particularly, it has to do with a filling apparatus for filling paperboard cartons of the type disclosed in Patent No. 2,470,984, issued May 24, 1949, to Horning et al., with liquid material, such as milk.

It is well known in dairy practice that milk has a decided tendency to foam or froth when agitated, particularly when poured from one container into another. This foaming action is particularly troublesome in the filling of containers, such as bottles, cartons, etc., which are used to package the milk for delivery to customers. These containers are constructed to contain a predetermined quantity of milk, such as a pint, quart, etc. In dispensing the liquid milk into the containers, the agitation of the milk, incident to it being dispensed in the container, creates an appreciable amount of foam. Inasmuch as it is not practical to make the container appreciably larger than necessary to contain the desired quantity of milk, the foam on the top of the milk causes difficulty in applying the top closure to the container. This foaming is caused partly by the strong film strength of the milk and the presence of air in the liquid which, to a great extent, is taken in through joints and couplings in the apparatus in the dairy. A joint or coupling may not be loose enough to leak milk but will, nevertheless, admit air into the operating circuit.

At the present time, a large portion of liquid milk processed for consumption is homogenized and this process increases the film strength of the milk and accordingly, increases the foaming action during the filling of the containers. It is also desirable to bottle milk at a relatively low temperature, the present practice being in the neighborhood of 40° F., and a desirable practice would be between 33° and 35°. However, the lower the temperature of the milk, the greater the tendency of the milk to foam.

Attempts have been made to solve this problem by providing the filling apparatus with a vacuum arrangement to evacuate or remove the foam from the top of the container. The foam thus removed from the container is transferred back to the liquid supply reservoir and, in some instances, mechanism is provided in the reservoir to mechanically break up the foam. In some instances, steam is blown into the top of the filled container in order to break up and dispense the foam. With certain types of containers, including some types of paperboard milk cartons, this method is not expedient and in some cases the difficulty of solving the foaming problem has been so great that no attempt is made to control foaming of the milk, it being permitted to foam and run over, or out of the top of the container, and after the container has been closed, it is rinsed off to dispose of the milk accumulated on the outside thereof.

With this situation in view, this invention has as an object a carton filling apparatus embodying a novel structure with which cartons may be rapidly filled with milk at low temperature without appreciable foaming or frothing of the liquid.

The invention has as a further object a filling apparatus of the type referred to embodying a structure by which all of the operating elements which are contacted by the milk can be quickly and conveniently dis-assembled for proper cleaning and without the use of special tools.

The invention has as a further object a liquid dispensing apparatus which may be quickly and conveniently adjusted to dispense, with great accuracy, different quantities of liquid and which, after dispensing a quantity of liquid, will not drip or leak.

The invention has as a further object a filling apparatus operable to automatically fill cartons being rapidly advanced in a procession, the structure including a plurality of dispensing mechanisms, each operable independently of the other, for dispensing a relative large quantity of liquid in a relatively short length of time.

The invention has as a further object a filling apparatus of the type described embodying a structure operable to effectively dispense and fill containers with all kinds of milk products ranging from heavy cream to grade B milk, and to dispense accurate quantities of all such products without any change or adjustment in the filling apparatus.

The invention contemplates filling cartons of different sizes and capacities advanced in a procession, and the mechanism of the apparatus embodies a structure which is operable to automatically vary the quantities of liquid dispensed upon variation in the size of the cartons being advanced to the apparatus.

The invention consists in the novel features and in the combinations and constructions hereinafter set forth and claimed.

In describing this invention, reference is had to the accompanying drawings in which like characters designate corresponding parts in all the views.

Figure 6 is a vertical sectional view of the actuating mechanism for the dispensing units shown in section taken on a line corresponding to line 6—6, Figure 2.

Figure 7 is a side elevational view of the column supporting the dispensing units.

Figure 8 is a view taken on line 8—8, Figure 6.

Figure 10 is a view taken on a line corresponding to line 10—10, Figure 9.

Figure 11 is a view taken on a line corresponding to line 11—11, Figures 6 and 8.

Figure 12 is a view taken on line 12—12, Figure 6.

Figure 13 is a fragmentary sectional view taken on line 13—13, Figure 11.

Figure 14 is a view taken on line 14—14, Figure 8.

Figure 15 is a view taken on line 15—15, Figure 8.

Figure 16 is a view taken on line 16—16, Figure 8.

Figure 17 is a vertical sectional view of one side of the housing and motion transmitting mechanism mounted therein for operating the carton detecting mechanism.

Figure 18 is a view taken on line 18—18, Figure 17.

Figure 19 is a view taken on line 19—19, Figure 18.

Figure 20 is a view taken on line 20—20, Figure 17.

Figure 21 is a view similar to Figure 20 taken further along the guide rail in proximity to one of the container detectors.

Figure 22 is a view of the structure shown in Figure 20 showing the drive for the container detecting mechanism in side elevation, the outer wall of the guide rail supporting structure being cut away.

Figure 23 is a view similar to Figure 22 but taken in proximity to the carton detector member showing the actuating mechanism for this member in side elevation, the view in location corresponding to Figure 21.

Figure 24 is a view taken on line 24—24, Figure 21.

Figure 25 is a view taken on line 25—25, Figure 21.

Figure 26 is a fragmentary sectional view taken on line 26—26, Figure 8.

Figure 27 is a side elevational view of the manual for adjusting the apparatus to vary the quantity of liquid dispensed.

Figure 28 is a vertical sectional view taken on line 28—28, Figure 27.

Figure 29 is a transverse sectional view taken on line 29—29, Figure 27.

Figure 30 is a vertical sectional view of the upper portion of one of the piston actuating rods.

Figure 31 is a perspective view of the body portion of one of the dispensing units.

Figure 32 is a side elevational view of one of the dispensing valve stems.

Figure 33 is a perspective view of the lower portion of one of the dispensing units showing the flow of liquid being dispensed therefrom.

Figure 34 is a sectional view taken on line 34—34, Figure 33.

Figure 35 is a bottom plan view of the sleeve of the dispensing member.

Figure 36 is a sectional view taken on line 36—36, Figure 35.

Figure 37 is a developed view of the lower end of the sleeve, as shown in Figure 35.

The liquid dispensing apparatus herein disclosed forms part of a machine for automatically making, filling and sealing cartons of the type referred to and more particularly the mechanism herein described forms part of the machine disclosed in the copending application of Wilcox et al., Ser. No. 25,944, filed May 8, 1948, in which a number of the structural features of this invention are disclosed, and of which this application is a continuation in part.

The filling apparatus functions to automatically dispense liquid into and fill cartons C intermittently advanced in a procession under the dispensing mechanisms of the apparatus.

Figure 1:
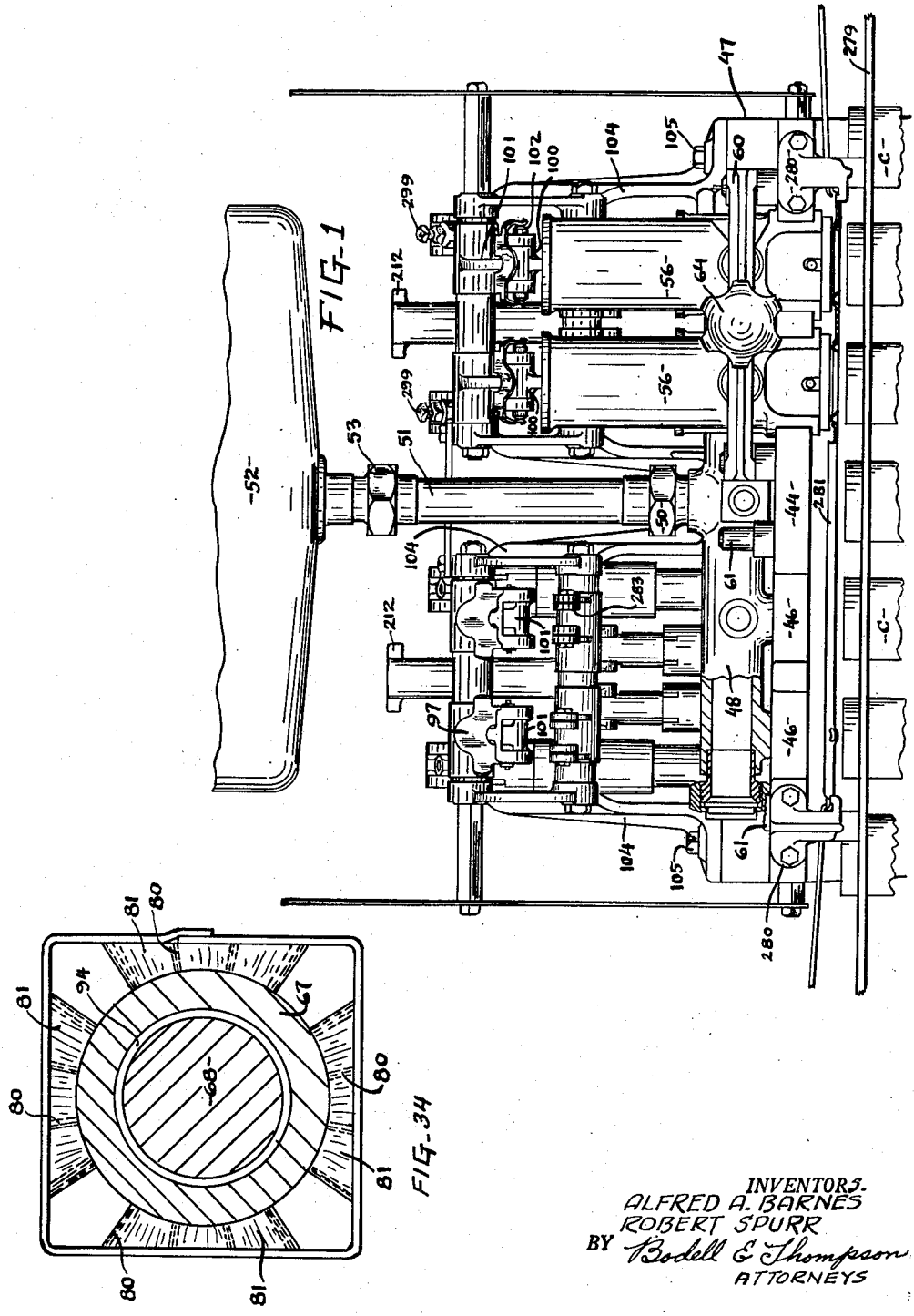
Figure 1 is a side elevational view of a filling apparatus embodying our invention, with parts of the apparatus removed and a portion of the supply manifold shown in vertical section.
Figure 2:
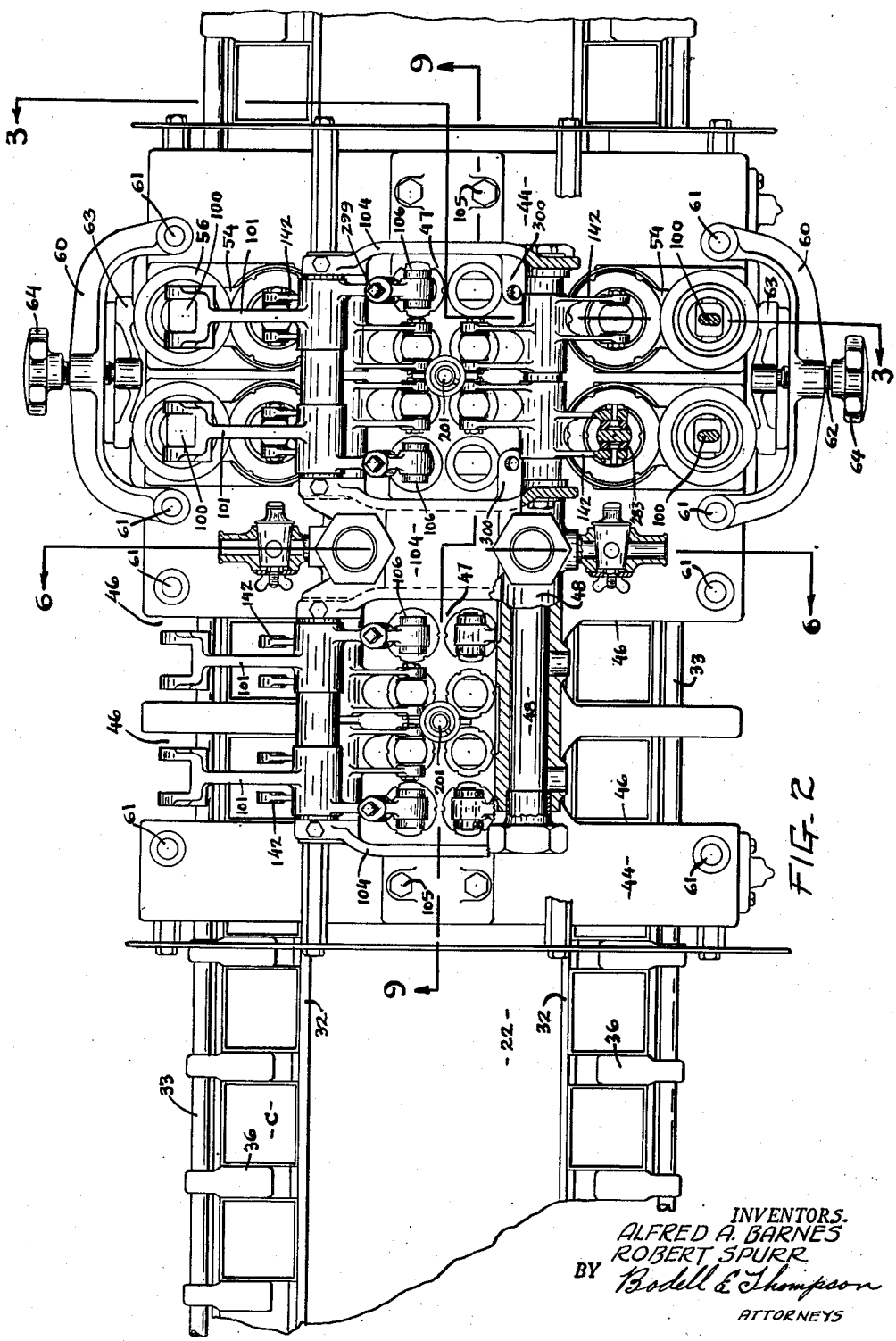
Figure 2 is a top plan view of the structure shown in Figure 1, with a corresponding portion of the liquid supply manifold shown in horizontal section.

The apparatus as a whole consists of a base 20 on which there is mounted a housing 22, in which is journalled a main cam shaft 24 extending lengthwise of the housing. The cartons C are advanced in a procession along guide rails 32 extending lengthwise of the housing along opposite sides thereof and in proximity to the top of the housing. The cartons are advanced by a rake-like mechanism comprising rods 33 on which there are mounted a series of spaced apart carton engaging members, each of these members being formed with inwardly extending arms 34, 35 and 36, the arms of each member being spaced apart vertically, see Figure 3. Mechanism is provided for effecting a rectangular movement of the carton advancing means whereby the carton engaging members are moved inwardly over the guide rails 32 between the cartons, as shown in Figure 2, then forwardly, from left to right, Figures 1 and 2, then outwardly clear of the cartons and the guide rails, then rearwardly to the start of the next cycle.

Figure 3:
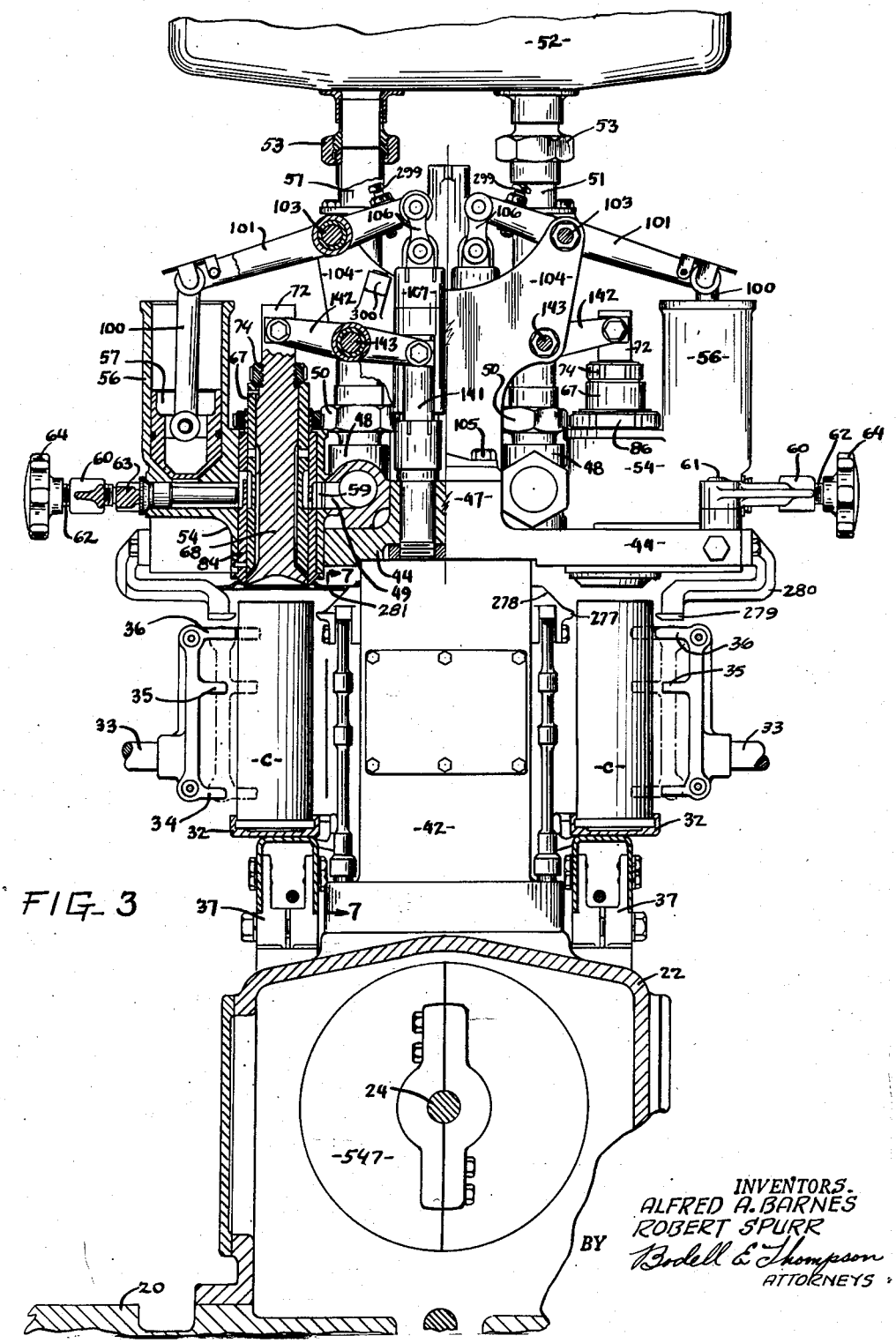
Figure 3 is an end elevational view of the apparatus with parts in section, the view being taken on a line corresponding to line 3—3, Figure 2.

The rails are supported by structures 37 mounted upon the base 20 and extending upwardly therefrom and being adjustable vertically. The rails are shown in Figures 3 and 6 in their lowermost position to accommodate the highest or tallest cartons, or those of greatest capacity such, for example, as one quart capacity. The rails 32 are adjusted upwardly to different selected positions to accommodate shorter cartons of less capacity, such as pint, half-pint, etc. These adjustments are provided for inasmuch as the mechanism and machine as a whole is intended primarily for packaging milk and other liquid, or semi-liquid, dairy products. The arrangement and structure for supporting and adjusting the guide rails and the mechanism for advancing the procession of cartons is disclosed in detail in the Wilcox et al., application. However, it will be understood as the description of the filling apparatus proceeds, any suitable carton conveyor or advancing structure or arrangement may be employed for intermittently advancing the procession of cartons.

The dispensing apparatus per se is supported upon a boxlike column 42 mounted upon the housing 22, as by screws 43, the column being arranged centrally of the housing 22 and positioned between the guide rails 32. The framework of the dispensing apparatus further includes a top plate 44 mounted on the top wall 45 of the column 42. This plate is coextensive in length with the column 42 but extends laterally a considerable distance beyond the sides of the column in overhanging relation with respect to the guide rails 32. The laterally extending portions of the plate 44 are formed with a series of recesses 46 extending inwardly from the side edges of the plate.

The central part of the top plate 44 is of appreciably greater thickness than the laterally extending portions, forming a rectangular pad 47, on each side of which is detachably mounted a liquid supply manifold 48. These manifolds extend lengthwise of the top plate and are formed on their outer sides with four discharge openings 49.

The filling apparatus includes four liquid dispensing units mounted in juxtaposition to, and connected with, each manifold 48. These manifolds are provided at their centers with a coupling 50 for detachably connecting the manifolds to stand pipes 51, the upper ends of which are connected to a tank or reservoir 52 by upper couplings 53.

Each of the dispensing units consists of a body 54 formed on opposite sides adjacent their lower ends with recesses 55 to slidably receive the contiguous portions of the top plate 44, the bodies 54 sliding into the recesses 46 formed in the plate. Each of the bodies 54 is formed with a measuring cylinder 56 in which there is mounted for reciprocation an adjustable volume dispensing piston 57. The inner sides of the bodies 54 are moved into engagement with the manifolds 48, and the bodies are formed intermediate the manifolds and the cylinder 56 with vertically extending bores or passages 58 in which the dispensing members are mounted for vertical reciprocation. The body members 54 are formed on their inner sides with inlet ports 59 arranged in register with the outlet ports 49 formed in the manifolds 48. The abutting marginal surfaces around the ports 49, 59, are made, or formed, in the nature of a ground joint, and the bodies are detachably clamped against the manifolds, and the manifolds clamped against the sides of the pad portion 47 by yoke clamps 60, U-shaped in general form, and provided at their ends with apertures to receive pins 61 mounted adjacent the edges of the overhanging portion of the top plate 44. The yokes 60 are formed at their centers with threaded apertures to receive screws 62, the inner ends of which engage a cross member 63 spanning two contiguous dispensing units. The screws 62 are provided with hand wheels 64. It will be apparent that when the screws 62 are tightened, the bodies of the dispensing units are firmly pressed against the manifolds which are backed up by the pad portion 47, see Figures 2 and 3.

The liquid dispensing member of each unit is in the form of a tube arranged in the vertical passage intermediate the cylinder and manifold, and is formed at its lower end with a plurality of circumferentially spaced apart outlet slots disposed horizontally and which function to discharge sheets or curtains of liquid. The cartons C are square in cross section, and the dispensing member is arranged to discharge a curtain of liquid against the inner surface of each side of the carton adjacent the top edge thereof, whereby the cartons are filled by these curtains or sheets of liquid passing downwardly over the inner surface of the sides of the cartons, as distinguished from pouring or discharging the liquid in the form of a stream into the center of the carton from a conventional nozzle or outlet. This arrangement, plus the fact that these curtains of dispensed liquid are separated at the corner portions of the cartons, results in the liquid being dispensed into the cartons with no appreciable foaming. The interruption in the curtains of liquid at the corner portions of the carton provide ample area, or areas, for the escape of air from within the carton during the filling operation.

As disclosed herein, the dispensing member is made up of a sleeve 67 in which is mounted a stem 68, the lower portion 69 of which is of reduced diameter and terminates in an enlarged portion 70 overlying the lower end of the sleeve 67. The portion 69 is formed with a plurality of circumferentially spaced apart axially extending ribs 71, the upper portion of the stem 68 and the ribs 71 slidably engaging the inner surface of the sleeve 67, Figures 4, 5 and 32. The stem 68 is formed with an upper portion 72 projecting beyond the upper end of the sleeve and being threaded as at 73 to receive a nut 74 engaging the upper end of the sleeve and serving to detachably secure the stem within the sleeve.

The lower end of the sleeve is of conical formation and provided with projections 75, Figures 35, 36 and 37. The confronting surface of the enlarged portion 70 of the stem is of complemental conical formation 76 which abuts against the projections 75 forming four horizontally disposed discharge slots 77, Figures 32, 33. Also the confronting surface of one of these members, such as the sleeve 67, is formed with a plurality of recesses or notches 78 forming enlargements at spaced intervals in the discharge slots 77 and effecting a plurality of ribs 80 in the curtains 81 of the discharged fluid.

The sleeve 67 also serves as a valve member for connecting the measuring cylinders 56 to the manifolds 48 during the charging of the cylinder, and during the discharge of the cylinder, the sleeves 67 are shifted to permit the liquid to flow downwardly through the sleeve. This valve action is accomplished by the sleeves 67 being mounted in the passages 58 of the body for reciprocation therein. As here shown, the sleeves are not mounted directly in the passages 58 of the body 54 but, in order to simplify the construction of the dispensing unit, the sleeves 67 are mounted in an outer sleeve 84 formed at its lower end with a shoulder 85 engaging the lower end of the body with the upper end of the sleeve extending through the body and being threaded to receive a nut 86 by means of which the outer sleeve is detachably secured in the body. This outer sleeve is formed with an inlet port 87 arranged in registration with the inlet port 59 in the body and, on its opposite side, it is formed with a port 88 communicating with a horizontally extending passage 89 communicating with a passage 90 formed in the bottom wall of the cylinder 56.

The sleeve 67 is formed with a circumferential groove 91 and with a port 92. When the sleeve 67 is moved upwardly to move the lower end thereof into the outer sleeve 84, the discharge slots 77 are closed and, in this position, the annular groove 91 is in registration with the inlet port 87 and the port 88 whereby, upon upward movement of the pistons 57, liquid is drawn from the manifolds 48 into the cylinders 56, see Figure 4. The cylinders 56 are so proportioned in respect to the stroke of the pistons that a predetermined accurate quantity of liquid is drawn into the cylinders and discharged through the dispensing member in each dispensing operation.

Figures 4, 5:
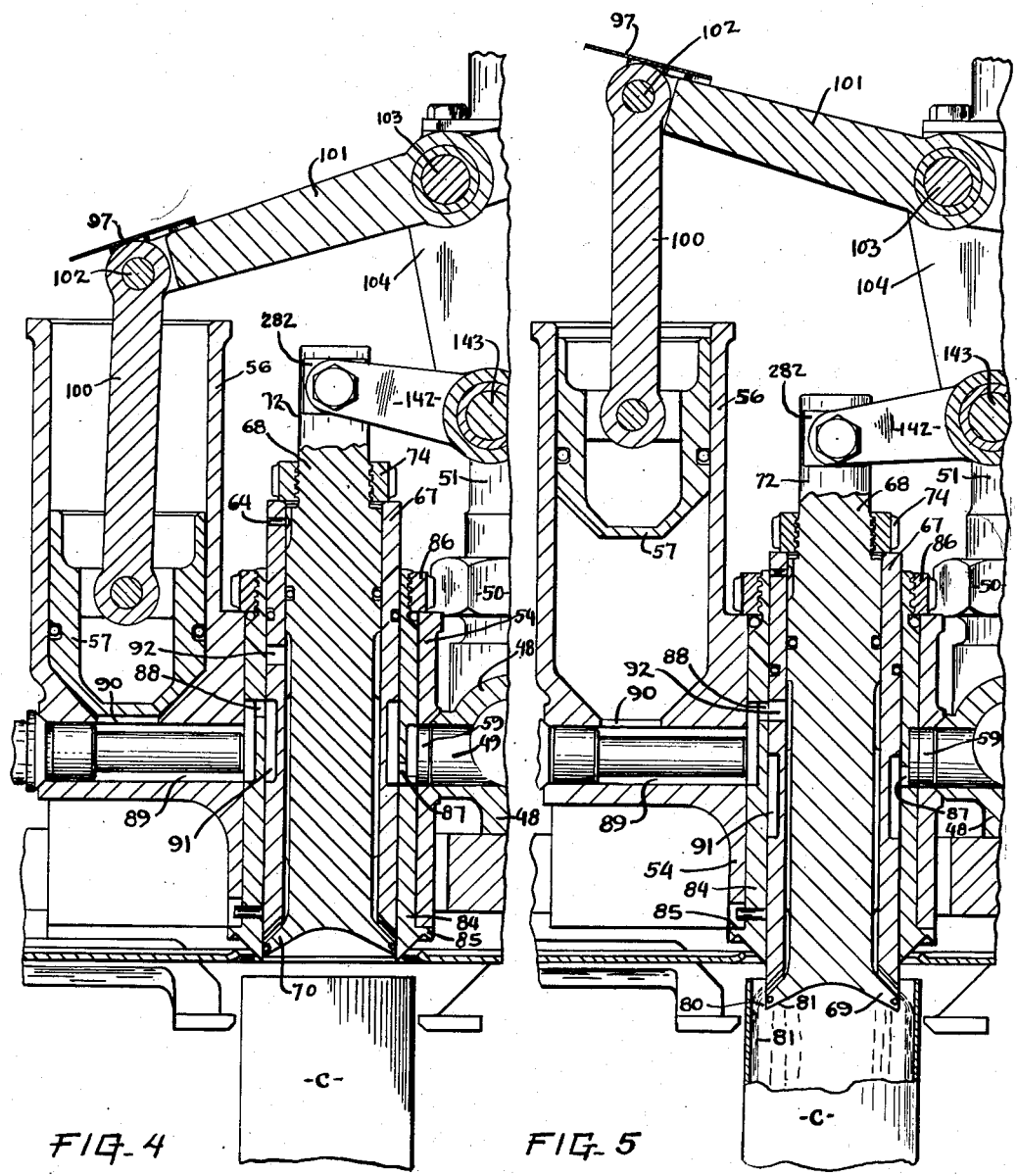
Figure 4 is an enlarged vertical sectional view of one of the dispensing units of the apparatus with the dispensing valve shown in closed position.
Figure 5 is a view similar to Figure 4, with the dispensing valve shown in the open position.

To effect discharge of the liquid from the cylinders 56, the sleeve 67 is moved downwardly, as shown in Figure 5, moving the lower end of the sleeve out of the sleeve 84 and simultaneously, moving the groove 91 out of registration with the port 88, and moving the port 92 into registration with port 88 whereby, upon downward stroke of the pistons 57, the liquid is discharged through the passages 90, 89, ports 88, 92, into the space 94 between the portion 69 of the stem and the sleeve 67, and thence outwardly through the discharge slots 77.

The apparatus includes motion transmitting mechanism for effecting reciprocation of the pistons and discharge members in timed relation. This mechanism includes cams 543, 544, 545, 546 and 547 secured upon and rotatable with the cam shaft 24 journalled in the housing 22. The cams 543 and 547 effect reciprocation of the dispensing members 67, 68. The cams 544, 546 effect reciprocation of the pistons 57. The pistons are secured to connecting rods 100, the upper ends of which are pivotally connected to rocker arms 101, as by pins 102. These arms are journalled intermediate their ends on pins 103 carried by brackets 104 mounted on the pad 47, as by screws 105. The inner ends of the arms 101 are connected to links 106 which, in turn, are connected to cap members 107 secured to the upper ends of rods 108 slidably mounted for vertical movement in bushings 109 secured in the pad portion 47 of the top plate 44, the lower portion of these rods being slidably mounted in a web or partition 110 in the column 42 and extend downwardly below the web through a plate 111.

Push rods 112 are fixedly secured in the ends of the plate 111, and the lower ends of the rods are secured in yokes 113 having rollers 114 positioned in the slot 115 of cams 544, 546 whereby, upon rotation of the cam shaft 24, the plate 111 is moved up and down. The rods 112 are slidably mounted in bosses 116 extending inwardly from each end of the column 42 and the rods extend upwardly from the plate 111, through guide bushings in the web 110, see Figure 9, the rods also extending upwardly through an upper plate 117 mounted above the web 110, see Figures 8 and 9. With this arrangement, the plate 111 is moved up and down upon rotation of the cam shaft 24.

The rods 108 are provided with fixed collars 119 positioned above the plate 111 and below the web 110. Upon upward movement of the plate 111, the rods 108 are moved upwardly by these collars.

As previously stated, there are four dispensing units arranged above each of the carton guide rails 32. Accordingly, there are eight of the actuating rods 108, these rods being arranged in groups of four in each end portion of the pad 47, web 110 and plates 111, 117, see Figures 10 and 11. This arrangement will be also apparent from a perusal of the top plan view in Figure 2.

The rods 108 are formed with notches to receive latch members 120, better illustrated in Figure 13. The under side of the plate 111 is formed with slots 121 extending lengthwise of the plate. Each slot extends in register with a pair of the rods 108. The latch members 120 are mounted in these slots and retained therein by plates 122 secured to the under side of the plate 111. Each of the latch members 120 is bifurcated on one end, and has a roller 123 arranged in the end portion of the bifurcation, see Figures 11 and 13. The latch members are recessed to slidably receive a poppet 124, the outer end of which is of reduced dimension and is positioned in a keyway 125 formed in a pin 126 slidably mounted in the plate 111 and interposed between the roller 123 and the poppet 124, see Figure 13. The side of the pin 126, confronting the roller, is formed with a flattened surface 128 merging into an inclined cam surface 129. When the pin 126 is pushed upwardly in the plate 111, the roller 123, following the inclined surface 129, permits the latch member 120 to move to the right, Figure 13, into the recess formed in the rod 108, this movement being effected by a helical compression spring 130 interposed between the latch member and the poppet. When the latch is in this position, the rods 108 are connected to the plate 111 and move up and down with it. When the pins 126 are moved downwardly, the latches 120 are cammed out of engagement with the rods 108 and accordingly, when the plates 111 move downwardly, the rods 108 will not do so.

The intermediate portion of the rods 108 are machined to provide axially extending offset portions 131, 132, connected by an inclined portion 133. These portions of the rods 108 are employed to effect movement of a latch member 134 into and out of latching engagement with rods 135 which actuate the dispensing members 67, 68. In this case, slots 136 are machined in the top surface of the upper plates 117, the latches 134 being slidably arranged in these slots. A major portion of these latches is bifurcated to straddle the intermediate portions 131, 132 and 133 of the rods 108, and the rods are engaged on opposite sides by rollers 138 mounted in the bifurcated portion of the latch, and the confronting sides of the rods 135 are formed with notches 139. The latches are retained in the slots 136 as by plates 140, see Figures 9 and 10. With this arrangement, when the rods 108 move downwardly with respect to the plate 117, the latches 134 are moved into latching engagement with the rods 135 by the inclined surfaces 133 and likewise, when the rods 108 are moved upwardly with respect to the plate 117, the latches 134 are withdrawn from the rods 135. The rods 135 are provided at their upper ends with caps 141 pivotally connected to the inner ends of the rocker arms 142 which are journalled intermediate their ends on pins 143 carried by the brackets 104, the outer ends of the arms 142 being connected to the upper portion 72 of the stem 68. The rods 135 are mounted for vertical sliding movement in bushings 144 arranged in the top plate 44, the rods extending downwardly through the plate 117 and being slidably mounted in guide bushings arranged in the web 110, see Figure 9. The rods 135 are also provided with fixed collars 146 arranged on the under side of the plate 117 and being effective to be engaged by the plate and move the rods downwardly. The rods are moved upwardly by the latch members 134.

From the description thus far, it will be apparent that the actuating rods 108, 135, are not fixedly connected to the plates 111, 117. The reason for the latches 120, 134, is to provide means for disconnecting the rods 108, 135, from the actuating plates in the event it is desired to render one or more of the dispensing units inoperable as, for example, when a carton is absent in the procession of cartons being advanced beneath the dispensing units or, when the cartons being filled are of less capacity than the maximum size cartons which can be filled by the apparatus. For example, when quart cartons are being filled, all four of the dispensing units on each side of the machine are in operation. When pint cartons are being filled, two of the units on each side of the machine are rendered inoperable. For example, the two units to the left in Figure 1. When half pint cartons are being filled, the third unit on each side of the machine is also rendered inoperable, the cartons being filled by one unit. That is, the units are each capable of delivering a uniform quantity, such as a half-pint of liquid. It will be understood, of course, that the mechanism for advancing the cartons is operated in timed relation to the rotation of the cam shaft 24, and that the dispensing units are operated to dispense liquids during the dwell period of the carton advancing means.

Figure 9:
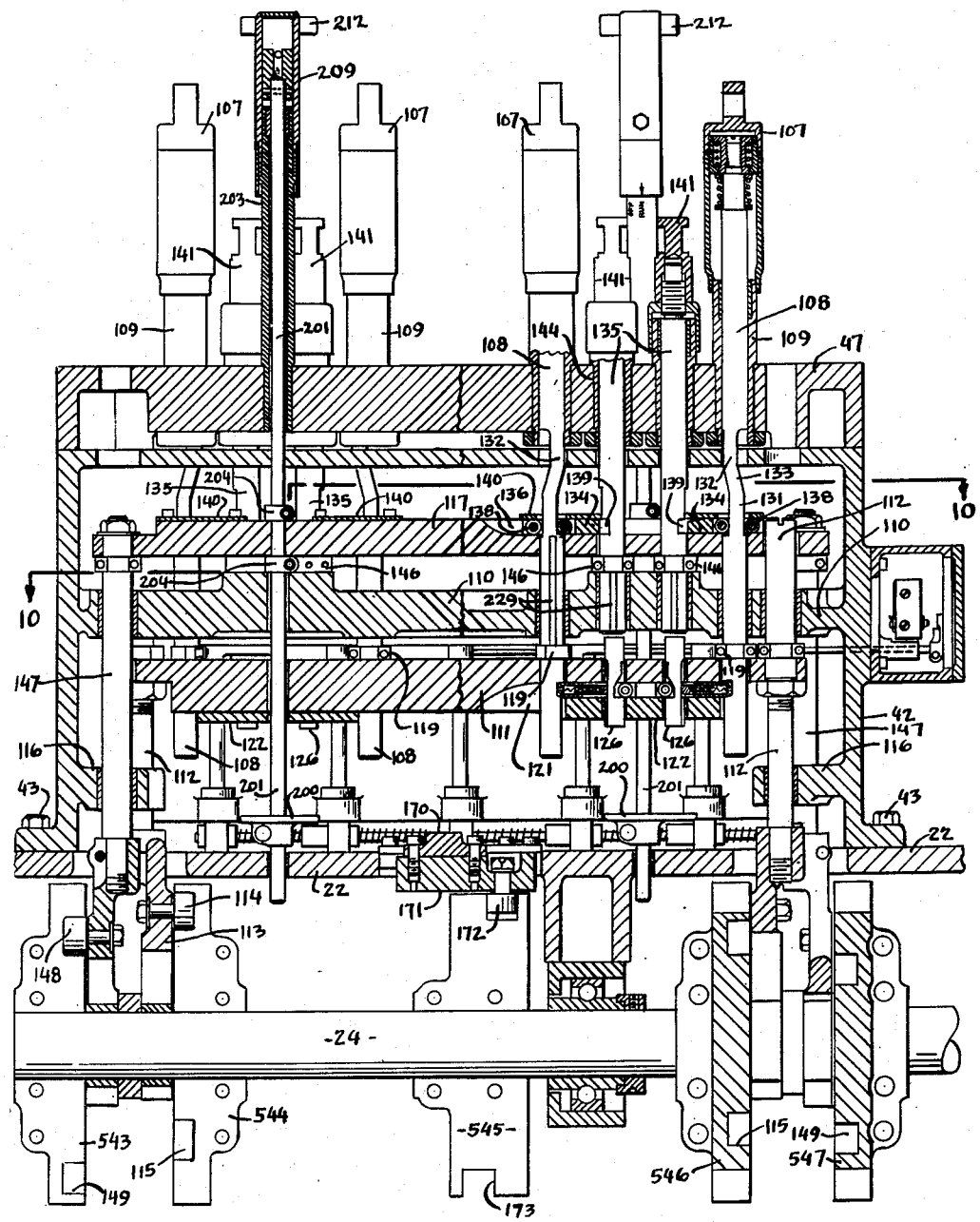
Figure 9 is a vertical sectional view of the column and actuating mechanism therein, taken on line 9—9, Figure 2.

In Figure 9, the plate 111 is shown at the top of its upward movement, and the plate 117 at the bottom of its downward movement. With the plates in these positions, the dispensing units are arranged as shown in Figure 4. That is, the pistons 57 are positioned in the bottom of the cylinders, and the dispensing valve members are in the up position with the discharge slots closed. The plate 111 is moved downwardly by the cams 544 and 546, and with the latch members 120 engaging the rods 108, the rods are moved downwardly oscillating the rocker arms 101 in a clockwise direction, Figure 4, moving the pistons upwardly. This downward movement of the rods 108 cammed the latch members 134 into engagement with the push rods 135. When the pistons reach the top of their stroke and have charged the cylinders 56 with liquid, the plate 117 moves rapidly upwardly and because the rods 135 are latched thereto, they likewise move upwardly, effecting oscillation of the rocker arms 142 in a counter-clockwise direction, moving the dispensing members 67, 68, downwardly to the position shown in Figure 5. The plate 117 is moved up and down in timed relation to the movement of the plate 111 by rods 147 fixedly secured at their upper ends to the plate. The rods 147 have yokes at their lower ends provided with rollers 148 arranged in grooves 149 of cams 543—547. The plate 111 then moves upwardly, effecting upward movement of the rods 108 and downward movement of the pistons 57, whereby the liquid is discharged from the slots 77. During the upward movement of the plate 117, the rollers 138 travel on the upper straight portion 132 of the rods 108. When the rods 108 were moved upwardly to effect discharge of the cylinders, the latches 134 were withdrawn from latching engagement with the rods 135. Upon the complete discharge of the liquid from the cylinders, the plate 117 is moved downwardly and through the fixed collars 146, the rods 135 are moved downwardly, moving the dispensing member into closed position. This is the normal running operation of the apparatus.

In the event a carton is missing in the procession, means is provided for moving the pins 126 downwardly in the plate 111 to draw the latch members 120 out of engagement with the rods 108. This mechanism consists of a series of arms 150, 151, 152, 153, periodically urged in a counter-clockwise direction about their pivots 154 to move the ends of the arms into engagement with the cartons C positioned on the guide rails 32. These arms are connected to arms 155, 156, 157, 158, respectively, movable into notches formed in enlarged portions 159, 160, 161, formed on shafts 162, 163, 164, 165, journalled vertically exteriorly of the side walls of the column 42. Each of these shafts is provided at its lower end with an arm 166 extending inwardly of the column and being positioned in a transversely extending slot 167 formed on the upper side of a collar 168 slidably mounted upon a rod 169, see Figures 6 and 12. There is one of these rods extending along each side of the column, and there are a plurality of the collars 168. As previously stated, there are four dispensing units and accordingly, four filling stations on each guide rail 32, and there are a series of arms 150—153 arranged in juxtaposition to each guide rail, and there are a series of shafts 162—165 along each side of the column.

The rods 169 are reciprocated by a yoke member 170 arranged centrally in the column and attached to a slide 171 mounted in the top wall of the cam housing 22 and having depending on its under side, a roller 172 positioned in a cam slot 173 in the cam 545 mounted upon the shaft 24. Each rod 169 has fixedly secured to it a collar 174 arranged to engage each of the collars 168, and there is a helical compression spring 175 interposed between each of the sliding collars 168 and the fixed collars 174. With this arrangement, the shafts 162—165 are positively oscillated in one direction by the cam 545, and yieldingly urged in the opposite direction by the springs 175.

There are a series of shafts 176, 177, 178, 179, journalled vertically inside of the column 42, and the lower ends of these shafts are provided with outwardly extending arms 180 arranged in transversely extending slots on the under sides of the slidable collars 168. These shafts 176—179 are paired with the shafts 162—165 respectively whereby, the shafts 176—179 are oscillated in like fashion by the cam 545. The shafts 176—179 have secured to their upper ends arms 181. When the yoke 170 is moved to the right, Figure 12, the shafts 176—179 are oscillated to move the arms 181 over the tops of the pins 126, as indicated by the two arms 181 at the left, Figure 11. When the yoke is returned by the cam, the shafts 176—179 are oscillated in the opposite direction through the compression spring 175 to move the arms 181 into the positions shown by the second pair of arms from the left in Figure 11 out of interference with the pins 126. The yoke 170 is actuated by the cam 545 in timed relation to the movement of the arms 150—153 toward the cartons, this movement being under spring tension. If a carton is present to be engaged by the ends of the arms 150—153, the arms will only have a limited movement toward the rails 32 and accordingly, there will only be a limited movement of the ends of the arms 155—158 away from the enlargements on the shafts 162—165. At this time, the shafts 162—165 positioned in the upper portion of Figures 11 and 12 have been oscillated in a counter-clockwise direction by the yoke 170 and the shafts 162— 165 in the lower portion of Figures 11 and 12 have been oscillated in a clockwise direction by the yoke to move the notches in the enlarged portions 159—161 in register with the ends of the arms 155—158, and this movement effects oscillation of the shafts 176—179 to position the arms 181 out of interference with the pins 126, as shown in Figure 11. With a carton present, the end of the arms 150—153 will engage the carton and thus be prevented from moving about their pivots 154 and the ends of the arms 155—158 will not move out of the notches in the enlargements of the shafts 162—165, and accordingly, these shafts can not be oscillated in the opposite direction by the springs 175 when the yoke returns and, by the same token, the shafts 176—179 will not be oscillated in the opposite direction, and the arms 181 will not be moved over and in interference with the pins 126 on the upward movement of the plate 177. However, if there is a carton missing in the procession, the arms 150—158 will move toward the rails 32 far enough to move the ends of the corresponding arms 155—158, out of engagement with the notches in the enlargements 159—161, and the return movement of the yoke will permit the spring 175 to move the corresponding collar 168 rearwardly and to effect oscillation of the corresponding shaft 176—179 to swing its arm 181 over in interference with the corresponding pin 126. When this happens upon upward movement of the plate 111, the pin 126 will be forced downwardly, camming the latch 120 out of engagement with the corresponding push rod 108.

Referring to Figure 11, the dispensing units are arranged in registration with the shafts 162—165. That is, the second cartons from the left shown in Figure 11, are in registration with the shafts 162, the third cartons in registration with the shafts 163, etc. It will be observed however that the carton detector arms 150—153 extend rearwardly and accordingly engage cartons one station ahead of the filling stations. With the dispensing apparatus in the position shown in Figure 4, a carton has been filled and the dispensing member 67, 68, moved to closed position. As previously stated, the plates 111, 117, are positioned as shown in Figure 9.

If the carton detecting mechanism has detected the presence of a carton at the preceding station, the member 181 would not be pushed over the pin 126 and accordingly, when the cartons have been advanced one step forwardly by the carton advancing mechanism and the plates 111, 117, actuated by the cams 543, 544, 546, 547, the push rods 108 and 135 would be reciprocated to fill the carton now positioned under the dispensing mechanism. However, if during the filling of a carton the detecting mechanism does not detect a carton at the preceding station, the arm 181 is swung inwardly over the pin 126 and accordingly, when the plate 111 is moved upwardly to the position shown in Figure 9, the corresponding pin 126 will be pushed downwardly unlatching the corresponding push rod 108 from the plate, and then during the next cycle of the cam shaft 24, the plate 111 will be moved up and down, but the push rods 108 will not be reciprocated and inasmuch as the push rods 108 are left in the up position, they have cammed the latches 134 out of engagement with the push rods 135 so that they are not reciprocated by the plate 117. Therefore, if a carton is absent in the procession being advanced along the guide rails 32, the liquid dispensing units will not function, but will remain in the position shown in Figure 4.

When any of the pins 126 have been pushed down in the plate 111 because of the absence of a carton in the procession, as just explained, they are reset, or pushed upwardly, upon movement of the plate 111 to the bottom of its stroke. This is accomplished by a pad 200 fixed to a stem 201 arranged vertically in the housing 42. This stem has clearance through the web 119 and the lower plate 111. The lower end of the stem is slidably mounted in the top wall of the cam housing 22, and the upper end of the stem is slidably mounted in a sleeve 203 extending upwardly from the central portion 47 of the top plate 44. The stems are retained from axial movement in the upper plate 117 by collars 204 clamped to the stem and abutting against the upper and under sides of the plate, see Figures 9, 14 and 15. The upper end of the stem 201 has affixed thereto a member 205, as by a pin 206. The member 205 extends upwardly from the end of the stem and is bifurcated as at 207, the leg portions of the bifurcated part straddling a pin 208 extending transversely of a tubular cap member 209 slidably mounted upon the upper end of the sleeve 203. This cap member is provided with a screw 210 having its inner end positioned in a slot 211 formed in the sleeve 203. The cap member is formed with projections 212 in the form of finger engaging members to conveniently effect manual rotation of the cap member. The slot 211 is formed at each end with upwardly extending notches 214, and the cap member is urged upwardly by a helical compression spring 216 interposed between a shoulder 217 on the sleeve 203 and an internal shoulder formed in the cap member, see Figure 28. When the cap member is depressed slightly against the spring 216, it can be turned to the extent permitted by the slot 211, as will be apparent.

Referring to Figure 11, it will be observed that the pins 126 are grouped in rectangular formation about the stems 201. One of the pads 200, as the pad at the left, Figures 9 and 12, is formed with four circumferentially spaced radially extending projections 220. The other pad is of substantially semi-circular formation having one radially extending projection 221. When the left pad is positioned, as shown in Figure 12, the projections 220 are engaged by the pins 126 upon downward movement of the plate 111 and accordingly, if any of those pins have been pushed downwardly by the arms 181, they will be pushed upwardly, or reset, permitting the latch members 120 to enter the notches in the rods 108 when the notches become alined with the latches. When the pad 200, in the right end of the column is positioned as shown in Figure 12, it likewise will be engaged by all four of the pins 126 in that group.

All four of the dispensing mechanisms on each side of the column 42 deliver a like or uniform quantity of liquid such, for example, as half-pint. When quart containers are being filled, all four dispensing units operate each depositing a half pint of liquid in the container at each filling station. When pint containers are being filled, the first two dispensing units on each side of the machine at the left, Figures 1 and 11, are rendered inoperable. These units are also rendered inoperable automatically upon elevation of the guide rails 32 from the position accommodating the quart cartons to the position accommodating the pint and half-pint cartons. However, by manipulating the member 209, associated with the dispensing units at the left in Figures 1 and 9 to 12 of the drawings, these four units are rendered inoperable. This operation consists of rotating the member 209 approximately 45° and accordingly, rotating the stem 201 and the pad 200 likewise. This moves the projections 220 of the pad out of registration with that group of pins. Accordingly, when they have been moved downwardly in the plate 111, they will remain in that position and that group of push rods 108, 135, will not be actuated. This operation does not affect the next four units or those at the right, Figures 1, 9 and 12, these units functioning to fill pint containers.

When it is desired to fill half-pint containers, thereby necessitating the operation of only one dispensing unit on each side of the machine, the stem 201 at the right end of the column, Figures 9–12, is rotated, moving the projection 221 and the portion 222 of that pad out of registration with the first pair of pins 126, thereby rendering the third dispensing unit on each side of the machine inoperable.

Referring again to Figure 7, it will be observed that the first two shafts at the left, 162 and 163 have only the enlarged portions 159 in proximity to the lower ends of the shafts, while the shafts 164 have the enlarged portions 159 and 160, and the last shafts 165 have the three enlarged portions 159, 160 and 161. In this connection, it will be observed that there is a shaft 738 positioned intermediate the shafts 163 and 164. This shaft 738 constitutes part of a carton detecting mechanism operable in conjunction with a portion of the complete machine for applying top closures to the filled containers. It forms no part and has no connection with the filling apparatus herein described. The carton detecting members 150—153 are mounted upon the guide rails 32, as will be hereinafter more fully explained. Accordingly, when the guide rails are elevated to a selected position, the detecting arms also are elevated. Accordingly, when the guide rails are elevated from the quart position upwardly to the pint position, the tail or latch portions 155, 156, of the arms 150, 151, do not have any enlarged notched portion to engage on the shafts 162, 163, and it will be apparent, from the structure previously described, that if these shafts are not restrained against retrograde rotation, the corresponding arms 181 will be moved inwardly over the pins 126 and accordingly, those two dispensing units will be rendered inoperable. However, the shafts 164 and 165, associated with the last two dispensing units, are provided with the upwardly spaced enlarged notch portions 160 and therefore, they will be controlled by the container detector arms 152, 153 and their latch portions 157, 158. When the guide rails are elevated still farther for say half-pint cartons, the third unit will be rendered inoperable because only the last shaft 165 has the third enlarged notch portion 161. Accordingly, if the operator elevates the guide rails for cartons of smaller capacity, the filling apparatus is automatically adjusted to dispense the right amount of liquid into the cartons. The purpose of having the manually controlled means, including the stems 201 and the pads 200, is to avoid the necessity of reciprocating the pins 126 up and down in the plate 111 when long runs of cartons of smaller capacity are made.

It will be observed that the pins 126 are frictionally retained in the up or the down position by action of the springs 130 and the latches 120. The rods 108 and 135 are also frictionally restrained against axial movement by poppets 225 slidably mounted in bores 226 formed in the plate 110, the poppets being urged inwardly by helical compression springs 227, the outer end of the springs acting against plugs 228 threaded into the outer ends of the bores 226, see Figure 26. The inner ends of the poppets are of reduced dimension and enter keyways 229 in rods 108 and 135, see Figures 9, 14 and 15.

The carton detector arms 150—153 are oscillated about their pivots 154 in timed relation to the rest of the mechanism of the apparatus by actuating means located in the cam housing 22 at a place somewhat remote from the filling apparatus. As previously stated herein, the cam housing and base 20 are of appreciable length and mechanisms in addition to the filling apparatus are mounted thereon as, for example, a mechanism for applying and sealing end closures to the cartons after they have been filled.

The guide rails 32 include, or are mounted upon, a channel structure 235 supported by the structures 37, two of which are shown in Figure 3. The carton detector arms are each journalled in a block 236. These blocks are secured in the channel formation 235, as by screws 237. Each arm has a forwardly extending arm 238 arranged on the underside of the pivoted portion of the arms 150—153 and each of the arms 238 have a roller 239 engaging a cam member 240 secured to a push rod 241. The push rods 241 extend lengthwise of the channel formations 235 and are slidably mounted in bearing blocks 242. The assembly including the arms 150—153, the latch arms 155—158, and the arms 238 are urged in a counter-clockwise direction about the pivots 154 by helical compression springs 243 acting against the arms 238, see Figure 21. When the rods 241 are moved to the right, Figures 20–22, the cam blocks 240 engage the rollers 239 and thus prevent movement of the arms 150—153 inwardly over the guide rails 32. When the rods 241 are moved to the right, Figure 21, the cam blocks 240 permit such movement of the arm assemblies by the springs 243.

The push rods 241 are reciprocated by mechanism shown in Figures 17 to 20 and 22. A cylindrical cam 250 is mounted upon the main cam shaft 24 and is formed on its periphery with a cam groove in which is located a roller 251 carried by a slide 252 mounted for reciprocation in a pad 254 secured in the upper wall of the base 20. The slide is formed with a transversely extending slot 255 to receive rollers 256 mounted on the inner ends of arms 257, these arms being pivotally mounted intermediate their ends on studs 258 carried by brackets 259 secured in the cam housing 22. The opposite ends of the arms 257 are formed with gear quadrants 260 arranged in mesh with pinions 261 secured on the lower ends of the shafts 262, as by nuts 263. The shafts 262 are journalled vertically in the cam housing 22, and the upwardly extending portions 264 of the shafts are of square formation. A block 266 is mounted in each channel formation 235, as by screws 267. There is one of these blocks 266 directly above each of the shafts 262, and a stub shaft 268 is journalled in each of the blocks 266 in axial registration with the shafts 262. A tubular member 269 depends from each shaft 268, and the lower end of the tubes 269 is provided with a square bore to slidably receive the square portions 264 of the shafts 262. With this arrangement upon rotation of the cam shaft 24, the shafts 268 are oscillated in the blocks 266.

A pinion 270 is secured to each of the shafts 268 and are arranged in mesh with gear rack portions 271 formed on rods 272 slidably mounted in the blocks 266 and extending parallel to the push rods 241 and are attached thereto by clamp members 273, see Figures 20 and 22. Accordingly, the push rods 241 are reciprocated in the channel formations 235 in timed relation to the main cam shaft 24 from which the liquid dispensing mechanism is also operated. The arrangement is such that during the dwell period of the cartons C on the guide rails 32, the arms 150—153 are moved inwardly so that the end portions 275 will contact a carton if one is present at that position on the guide rails. The presence of a carton in registration with any of the detector arms prevents such inward movement under the influence of the springs 243 and accordingly, prevents the latch arms 155—158 from moving out of latching engagement with the enlarged notch portions 159—161 of the shafts 162—165, as previously explained.

During advancement of the cartons along the guide rails 32, the upper ends of the cartons are guided by ribs 277 formed on the upper bearing blocks 278 of the shafts 162—165 and by outer guide members 279 carried by brackets 280 secured to the top plate 44, see Figures 1 and 3. These brackets also carry a shield plate 281 having openings in register with the dispensing unit.

The apparatus described functions to fill cartons rapidly, or at high speed, with liquids having a marked tendency to foam, the dispensing units functioning to reduce such foaming to a degree where it is not objectionable, or in any way interferes with the filling operation. Attention is called to the structural arrangement by which the dispensing units may be quickly and conveniently removed for cleaning and sterilizing, the units being removed in pairs by simply removing the yoke clamp 60 and when the units on one side of the machine have been removed, the manifold on that side of the apparatus is removed by unscrewing the coupling 50. In disconnecting the units from the actuating mechanism, it is only necessary to remove the pivot pins 102, disconnecting the connecting rods 100 from the actuating arms 101. The upper end portions 72 of the stems 68 are provided on opposite sides with flat notches 282 to receive rollers 283 carried on the bifurcated arms 142, thereby permitting the dispensing units to be slid out of the notches 46 in the top supporting plate.

In operation, the measuring pistons 57 are moved into engagement with the bottom of the cylinders 56 to dispense all of the liquid from the cylinders. Means is provided for a slight over-travel on both the upward and downward stroke of the push rods 108. Referring to Figure 30, the rods 108 are formed at their upper ends with a reduced portion 285 and a further reduced portion 286 threaded externally. The portion 285 is encircled by a compression spring 287 interposed between a washer 288 positioned at the lower end of the reduced portion 285 and a washer 289 positioned at the upper end thereof. A sleeve nut 290 is threaded upon the portion 286 and is encircled by a compression spring 291 interposed between the head portion 292 of the nut and a washer 293. A washer 294 is interposed between the washers 289 and 293 and between the portion 285 of the rod and the lower end of the sleeve nut 290. In other words, the washer 294 forms a fixed stop for the washers 289, 293.

The caps 107 are threaded internally to receive an externally threaded sleeve 295, and is formed with an inwardly extending annular flange 296 interposed between the washers 289, 293 but spaced from the periphery of the washers 294. An elongated sleeve 297 is threaded upon the lower portion of the sleeve 295 and is formed with a reduced lower end portion 298 slidably mounted upon the bushing 109.

With this arrangement, the upward movement of the push rod 108 is transmitted to the caps 107 through cap springs 287, permitting upward over-travel of the rods 108 after the pistons 57 have seated against the bottoms of the cylinders 56.

The extent of the upward movement of the pistons is controlled by adjustable stops 299 carried by the rocker arms 101 and abutting against bosses 300 carried by the brackets 104. When the stops 299 are moved into engagement with the bosses 300, downward over-travel of the rods 108 is permitted by the springs 290. Accordingly, the bottom limit of the pistons is fixed, and the upper limit can be adjusted to deliver very accurate quantities of liquid.

The dispensing units are readily completely disassembled by removing the nuts 74, 86, whereby all of the parts contacted by the liquid being dispensed may be readily cleansed and sterilized.

What we claim is:

1. Apparatus for filling open-ended cartons comprising a guide rail adapted to support a procession of cartons, a plurality of liquid dispensing units, each adapted when operable to dispense a predetermined quantity of liquid into cartons positioned in registration with said units, push rods operable upon reciprocation to effect operation of said dispensing units, actuating plates, power means operable to effect reciprocation of said plates in a direction parallel to said push rods, latch members carried by said plates and being movable into and out of latching engagement with said rods, carton detecting means operable upon the absence of a carton positioned in registration with a dispensing unit to move the latch member associated with the push rod of said unit out of latching engagement.

2. Apparatus for filling open-ended cartons comprising a guide rail adapted to support a procession of cartons, a plurality of liquid dispensing units, each adapted when operable to dispense a predetermined quantity of liquid, push rods operable to effect operation of said dispensing units, actuating plates, power means operable to effect reciprocation of said plates in a direction parallel to said push rods, latch members carried by said plates and being movable into and out of latching position with said rods, and manually operable means cooperable to maintain certain selected ones of said latch members out of latching position.

3. Apparatus for filling open-ended cartons, a guide rail adapted to support a procession of cartons, said rail being adjustable vertically to accommodate cartons of different capacities, a plurality of liquid dispensing units, said units being adapted when operable to successively dispense a predetermined quantity of liquid into a carton as the same is successively presented to said units, push rods operable upon reciprocation to effect operation of said dispensing units, actuating plates, power means for effecting continuous reciprocation of said plates in a direction parallel to said rods, latch members carried by said plates and being movable into and out of latching engagement with said rods, and means operable to automatically maintain selected ones of said latches out of latching engagement when said guide rail is elevated from a position accommodating cartons of a predetermined capacity to a position accommodating cartons of less capacity.

4. Apparatus for filling open-ended cartons comprising a frame, a liquid supply manifold mounted on the frame, a dispensing unit mounted on the frame, said unit being formed with a measuring cylinder and a vertically extending passage arranged between the cylinder and said manifold, a sleeve detachably mounted in said passage and being provided with a manifold port communicating with said manifold and a cylinder port communicating with the cylinder, a dispensing valve member slidably mounted in said sleeve and being provided with a discharge opening at the lower end thereof, said valve member being movable into open and closed positions to open and close said dispensing opening, said valve being operable when in closed position to connect said manifold and cylinder ports, and in open position to disconnect said ports and permit discharge of liquid from the measuring cylinder through said discharge opening, a piston in said measuring cylinder, motion transmitting mechanism operable to effect reciprocation of said piston and to move said valve to closed position during the intake stroke of the piston, and to open position during the discharge stroke of said piston.

5. Apparatus for dispensing liquids comprising a liquid supply manifold, a dispensing unit detachably secured to said manifold, said unit comprising a body formed with a cylinder, a piston mounted for reciprocation in said cylinder, said body being formed with a vertically extending passage arranged intermediate said manifold and said cylinder, dispensing mechanism slidably mounted in said passage and including a sleeve, a closure member for the lower end of the sleeve and being cooperable therewith to form a plurality of horizontally extending outlet discharge slots, motion transmitting mechanism operable to effect reciprocation of said piston and sleeve, said sleeve being operable upon the intake stroke of said piston to connect said cylinder to the manifold, and upon discharge stroke of said piston to move out of said passage and effect discharge of the liquid through said outlet slots.

6. Apparatus for dispensing liquids comprising a liquid supply manifold having an outlet port, a dispensing unit including a body having an inlet port, means operable for detachably clamping said body against said manifold with said ports in registration, said body being also formed with a cylinder and a vertically extending passage intermediate the cylinder and said inlet port, a dispensing member arranged in said passage and being provided with a plurality of horizontally disposed outlet discharge slots at its lower end, said member being slidable in said passage to move the slotted end portion into and out of said passage to close and open said discharge slots, said dispensing member being operable when in closed position to connect said cylinder with said inlet port, and in open position to effect discharge of liquid from the cylinder through said outlet slots, a piston in said cylinder, and motion transmitting mechanism cooperable to effect movement of said piston on its intake stroke when said dispensing member is moved to closed position and to effect movement of the piston on its discharge stroke when said dispensing member is moved to open position.

7. Liquid dispensing apparatus comprising a body formed with a vertical passage, a valve sleeve slidably mounted in said passage and formed with outlet slots at its lower end, a liquid supply manifold, a measuring cylinder, a piston mounted for reciprocation in said cylinder, means operable to effect reciprocation of said piston and sleeve to effect movement of the lower portion of said sleeve into and out of said passage, said sleeve being operable when the lower end thereof is positioned in said passage to connect said cylinder to said manifold, and being operable when the lower end of the sleeve is moved outwardly from said passage to connect said outlet slots to the cylinder.

8. Apparatus for dispensing liquids including a vertically arranged sleeve, a stem mounted within the sleeve and having a conical portion overlying and closing the lower end of the sleeve, and means cooperable to detachably hold said stem in the sleeve and restrain the stem from axial movement relative to the sleeve, said sleeve being formed with a plurality of circumferentially extending and spaced apart outlet slots, and means operable to conduct liquid downwardly between said stem and sleeve.

9. A liquid dispensing apparatus including a member having a vertically extending passage through which the liquid is conducted, said member being formed with a plurality of spaced apart horizontally extending outlet slots communicating with the lower end of said passage, each of said slots being effective to discharge a curtain of liquid, each of said slots being formed with a plurality of spaced apart enlarged areas adapted to effect ribs of liquid in said curtains.

10. Apparatus for dispensing liquids comprising a dispensing member, means for supporting an open-ended carton below and in registration with said dispensing member, said member being formed with a vertically extending passage through which the liquid is conducted, said member having outlet slots therein communicating with said passage and providing completely enclosed areas of escape for the liquid being dispensed, said slots being effective to discharge a curtain of liquid against the inner surface of the side walls of the carton, the air in the carton escaping through the curtain of liquid intermediate the streams thereof dispensing from said slots.

11. Apparatus for dispensing liquids comprising a vertically arranged tubular member, a stem detachably mounted in said tubular member and having an enlarged end portion overlying the lower end of said tubular member and forming a closure therefor, said tubular member being formed at its lower end with circumferentially spaced apart axially extending projections abutting said enlarged end portion and operable to space the enlarged portion of the stem axially from the end of the tubular member.

12. Apparatus for dispensing liquids comprising a vertically arranged tubular member formed with circumferentially spaced apart axially extending projections on its lower end, a stem member fixedly mounted in said tubular member and having an enlarged end portion engaging said projections, said end portion and said projections forming circumferentially extending liquid discharging outlets.

13. Apparatus for dispensing liquids comprising a vertically arranged sleeve member, a closure member fixedly mounted to the sleeve member and having a surface confronting the lower end surface of said sleeve member, the confronting surface of one of said members having a plurality of projections abutting the confronting surface of the other member whereby the sleeve member and closure member cooperate to provide completely enclosed areas of escape for the liquid being dispensed intermediate the projections.

14. A liquid dispensing apparatus including a vertically extending tubular member formed at its lower end with a plurality of horizontally extending liquid discharge slots, each adapted to discharge a curtain of liquid, and said tube having additional discharge areas in proximity to said slots and adapted to discharge ribs of liquid in said curtains.

15. A dispensing unit comprising a body member formed with a vertical passage, a sleeve slidably mounted in said passage, a closure member for the lower end of the sleeve and being cooperable therewith to form a plurality of horizontally extending discharge slots, mechanism cooperable to effect reciprocation of said sleeve and closure member relative to said body member to cover and uncover said discharge slots, and means operable to supply a liquid to said sleeve.

16. Apparatus for filling open-ended cartons comprising a housing, a guide rail extending along the housing and adapted to support an advancing procession of open-ended cartons, a measuring cylinder, a piston mounted for reciprocation in said cylinder, a dispensing valve mechanism movable into open and closed positions, and operable in closed position to connect said cylinder to a liquid supply, and in open position to permit discharge of liquid from the cylinder, a push rod slidably mounted in the housing to effect reciprocation of said piston, a second push rod slidably mounted in the housing to effect reciprocation of said valve mechanism, a pair of plates mounted in the housing, cam means operable to effect reciprocation of said plates, one of said plates being provided with a latch member movable into and out of latching engagement with said piston push rod, carton detecting means cooperable to move said piston rod latch out of latching engagement upon failure of a carton being presented to said dispensing valve mechanism.

17. A liquid dispensing unit comprising a body formed with a measuring cylinder and said body having a vertically extending bore communicating with said cylinder, a piston arranged for reciprocation in said cylinder and being operable upon reciprocation to charge and discharge the cylinder, a sleeve detachably mounted in said bore, a liquid dispensing member comprising an inner sleeve slidably mounted in said first sleeve, and a stem detachably secured in said inner sleeve and having a head portion forming a closure for the lower end of said inner sleeve, said inner sleeve being formed at its lower end with a plurality of horizontally discharged slots, motion transmitting means cooperable to effect reciprocation of said piston and to effect movement of the lower end of said inner sleeve into said outer sleeve to close said discharge slots during the charging stroke of said piston, and to effect movement of the lower end of said inner sleeve out of said first sleeve during the discharge stroke of said piston.

18. Apparatus for filling open-ended cartons advanced intermittently in a procession on a guide rail adjustable vertically to different selected positions to accommodate cartons of different heights, said apparatus comprising a plurality of liquid dispensing units arranged above the guide rail, each of said units being adapted when operated to dispense a predetermined quantity of liquid into a carton, the total amount of liquid successively dispensed by all of said units being sufficient to fill a carton of certain capacity, push rods operable upon reciprocation to effect operation of said dispensing units, actuating plates, power means for effecting continuous reciprocation of said plates in a direction parallel to said rods, latch members carried by said plates and being movable into and out of latching engagement with said rods, and means cooperable to automatically maintain selected ones of said latches out of latching engagement with said rods at certain selected positions of said guide rail.

19. Apparatus for filling open-ended cartons advanced intermittently in a procession on a guide rail adjustable vertically to accommodate cartons of different capacities, said apparatus comprising a plurality of dispensing units arranged above the guide rail, each of said units being adapted when operated to dispense a predetermined quantity of liquid in the cartons as they are successively positioned below said units, the total liquid successively dispensed by all of said units filling cartons of certain capacity, push rods operable upon reciprocation to effect operation of said dispensing units, actuating plates, power means operable to effect continuous reciprocation of said plates in a direction parallel to said push rods, latch members carried by one of said plates, means yieldingly urging said latch plates into latching engagement with certain of said push rods, latch pins slidably mounted in said plate carrying said latch members and operable upon downward movement to move said latch members out of latching engagement, carton detecting means operable to detect the presence of a carton for the reception of liquid from each dispensing unit, and means controlled by said detecting means and cooperable upon the absence of a carton in the procession to effect downward movement of said pins.

20. Apparatus for filling open-ended cartons advanced intermittently in a procession on a guide rail adjustable vertically to different selected positions to accommodate cartons of different capacities, said apparatus comprising a plurality of liquid dispensing units arranged in a row above the guide rail, each of said units being adapted when operated to dispense a predetermined quantity of liquid into the cartons as they are successively positioned below the units, the total amount of liquid successively dispensed by all of said units being sufficient to fill a carton of certain capacity, push rods associated with each dispensing unit and operable upon reciprocation to effect operation thereof, power means common to all of said units for reciprocating said push rods, clutch members associated with the push rods of each dispensing unit and being movable into clutching engagement to connect said push rods with said power means and being movable out of clutching engagement to disconnect said rods from said power means, and means cooperable to automatically maintain selected ones of said clutches out of clutching engagement with the associated push rods at certain selected positions of said guide rail.

21. Apparatus for filling open-ended cartons advanced intermittently in a procession on a guide rail adjustable vertically to different selected positions to accommodate cartons of different heights, said apparatus comprising a plurality of liquid dispensing units positioned above the guide rail and arranged in a row extending in parallel registration therewith, each of said units including a cylinder and a piston slidably mounted therein and being operable upon reciprocation to dispense a predetermined quantity of liquid into a carton positioned below the unit, the total amount of liquid successively dispensed by all of said units being sufficient to fill a carton of certain capacity, power means operable to effect reciprocation of said pistons, and means operable to automatically disconnect certain of said pistons from said power means at certain selected positions of the guide rail.

22. Apparatus for dispensing liquids including a body member formed with a vertically extending bore, a sleeve slidably mounted in said bore and being formed at its lower end with a series of circumferentially spaced apart outlet slots, a closure member positioned against the lower end of the sleeve and fixed against axial movement relative thereto, means for supplying fluid to the interior of said sleeve, and motion transmitting mechanism operable to effect reciprocation of said sleeve in said bore to move the lower end portion of the sleeve into and out of the bore.

23. A dispensing unit comprising a body member formed with a vertical passage, a sleeve slidably mounted in said passage, a stem member extending axially through the sleeve and having a head portion seated against the lower end of the sleeve and forming a closure therefor, means cooperable with said stem and said sleeve to detachably secure the stem in the sleeve and restrain the stem against axial movement relative to the sleeve, the lower end of said sleeve being formed with a plurality of circumferentially spaced outlet slots, means for supplying fluid to the interior of the sleeve, and motion transmitting means operable to effect reciprocation of the sleeve to move the lower end portion thereof into and out of said bore.

24. Apparatus for dispensing liquids including a body member formed with a vertically extending bore, a sleeve detachably mounted in said bore, a second sleeve closed at its lower end slidably mounted in said first sleeve and being formed adjacent its lower end with discharge openings, said first sleeve being formed with a port connected to a supply of liquid, said second sleeve being formed with a passage extending through the side wall thereof and mechanism for moving said second sleeve downwardly to move the passage therein in registration with the port in said first sleeve and to move said discharge openings outwardly beyond the lower end of said first sleeve.

25. Fluid dispensing apparatus comprising a body member formed with a cylinder portion having a port at one end, a fluid supply manifold having a discharge port, said body having a vertical bore arranged intermediate said cylinder and manifold ports and communicating therewith, a sleeve closed at one end slidably mounted in said bore and being formed with a groove in its outer surface and extending circumferentially, a passage extending through the side wall of the sleeve in axially spaced relation to said groove, said sleeve being formed with a discharge opening adjacent the lower end thereof, a piston in the cylinder, motion transmitting mechanism operable to move said piston on charging and discharging strokes, motion transmitting mechanism operable to move said sleeve upwardly in said bore to close the discharge opening in the sleeve and position said groove in registration with said cylinder and manifold ports during movement of said piston on its charging stroke, and to move said sleeve downwardly to position the side wall passage in the sleeve in registration with said cylinder port and the discharge passage outwardly from the bore during the discharge stroke of said piston.

26. Fluid dispensing apparatus comprising a body member formed with a vertically extending cylinder portion having a port at one end, a fluid supply manifold detachably connected to said body and having a discharge port, said body being also formed with a vertically extending bore arranged intermediate said cylinder and manifold ports and communicating therewith, a sleeve slidably mounted in said bore, a stem positioned in said sleeve and having a head portion forming a closure for the lever end of the sleeve, the confronting surfaces of said sleeve and head portion being formed to provide circumferentially spaced openings for discharging fluid from within the sleeve laterally, said sleeve being formed on its outer surface with a circumferentially extending groove and with a passage extending through the side wall of the sleeve and spaced axially from said groove, a piston slidably mounted in said cylinder, means operable to effect reciprocation of said piston on charging and discharging strokes, motion transmitting means operable to move said sleeve upwardly in the bore to close said discharge openings and position said groove in registration with the cylinder and manifold parts during charging stroke of said piston, and to move said sleeve downward to position said discharge openings outwardly from the body member and to position said side wall passage in registration with the cylinder port.

27. Liquid dispensing apparatus for filling open-ended cartons comprising a frame, a liquid supply manifold having a plurality of outlet ports, a power operated dispensing unit arranged in juxtaposition to each of said outlet ports, each of said units including a body member formed with a measuring cylinder and a dispensing valve, and clamping means operable to detachably clamp said body members in liquid tight engagement with said manifold and to clamp said manifold to the frame.

28. Liquid dispensing apparatus for filling open-ended cartons, a guide rail adjustable vertically from low position to accommodate cartons of a certain height upwardly to a higher position to accommodate cartons of less height, a plurality of liquid dispensing units arranged above said rail and each having liquid dispensing parts operable through a cycle to dispense a predetermined quantity of liquid in cartons positioned below said units, power means for operating said units through repeated cycles, motion transmitting mechanism having parts movable to connect said power means to said dispensing units, a carton detecting member corresponding to each of said units, said members being carried by said guide rail, all of said detectors being cooperable upon engagement with the cartons when said rail is in the lowermost position to move said motion transmitting parts into connecting engagement to effect cyclic operation of said dispensing units, and certain of said carton detecting members being rendered inoperable upon elevation of said rail to move said motion transmitting parts into connecting engagement.

29. Apparatus for dispensing liquids comprising a frame, a measuring cylinder, a piston movable in said cylinder on charging and discharging strokes, a dispensing valve movable to connect said cylinder with a source of liquid during the charging stroke of the piston and to connect the cylinder with a discharge opening on the discharge stroke of said piston, a plate mounted for reciprocation in the frame, a piston actuating push rod slidably mounted in the frame and being operable upon upward movement to move said piston on its discharge stroke, a fixed abutment carried by said rod for engagement by said plate upon upward movement of the plate, a latch member carried by said plate and being movable into and out of latching relation with the push rod, a second plate mounted for vertical reciprocation in the frame, a valve actuating push rod, a fixed abutment carried by said valve actuating push rod for engagement by said second plate upon downward movement thereof, said valve rod being operable upon downward movement to move said dispensing valve in position to connect the liquid supply to the cylinder, a latch member carried by said second plate and being movable into and out of latching engagement with said valve rod, a pin slidably mounted in said first plate and being operable upon such movement to move the latch carried by said first plate into and out of latching engagement, an interference member movable into and out of position to be engaged by said pin upon upward movement of said first plate and being operable upon such engagement to cause said pin to move said latch out of latching position, said piston actuating rod being operable upon upward movement thereof to move the latch carried by said second plate out of latching engagement with said valve rod and being operable upon downward movement to move said latch into engagement with said valve rod, power means operable to reciprocate said plates continuously in timed relation, and container detecting means cooperable upon the absence of a container to be filled by said dispensing apparatus to move said interference member for engagement by said pin.

30. Apparatus for dispensing liquids into containers including a measuring cylinder, a piston mounted for reciprocation therein on charging and discharging strokes, an actuating rod for moving said piston, power means for actuating said actuating rod, clutch means shiftable into and out of clutching position to connect and disconnect said actuating rod from said power means, a container actuated means cooperable upon the presence of a container for reception of liquid from said cylinder to shift said clutch into clutching position and upon the absence of a container to shift said clutch means out of clutching position, and manual means cooperable to shift said clutch means out of clutching engagement.

31. Apparatus for filling open-ended cartons advanced intermittently in a procession on a guide rail adjustable vertically to different selected positions to accommodate cartons of different capacities, said apparatus comprising a plurality of liquid dispensing units positioned above the guide rail, each of said units being operable to dispense a predetermined quantity of liquid in the cartons as they are successively advanced in juxtaposition to the units, and each unit including a liquid measuring cylinder, a piston mounted for reciprocation in the cylinder on charging and discharging strokes, a dispensing valve, push rods for effecting reciprocation of said piston and valve in timed relation through a cycle of operations to dispense a predetermined quantity of liquid into a carton positioned in filling relation to the unit, a continuously operating power means, latch mechanism carried by said power means and movable into and out of latching relation with said piston push rods, latch actuating members carried by said power means for moving said latches into and out of latching relation, said latch actuating members being normally positioned to move said latches into latching engagement with said piston push rods, carton actuated means cooperable upon the absence of a carton positioned in filling relation to a unit to move the latch actuating member out of normal position and withdraw the latch from engagement with the piston push rod of said unit during a cycle of operation, and a reset member operable upon the end of said cycle to reset said latch actuated member, and manually operable means for rendering said reset member inoperative.

32. Apparatus for filling open ended cartons comprising a frame, a supply manifold mounted on the frame, a power operated dispensing unit operable to dispense a predetermined quantity of liquid from said manifold, a single clamp means cooperable to detachably clamp said unit in operative relation to said manifold and to clamp said manifold to the frame.

33. Apparatus for filling open-ended cartons advanced intermittently in a procession on a guide rail adjustable vertically to different selected positions to accommodate cartons of different capacities, said apparatus comprising a plurality of liquid dispensing units positioned above the guide rail, each of said units adapted when operated to dispense a predetermined quantity of liquid in a carton positioned below the unit, power means for operating said units, a carton detecting means associated with each of said units and operable upon the presence of a carton for reception of liquid from said associated unit to connect said unit to said power means, all of said carton detecting means being in operative position at one vertical position of the guiderail and only certain of said carton detecting means being out of operative position in other vertical positions of the guide rail.

34. Apparatus for filling open-ended cartons advanced intermittently in a procession on a guide rail adjustable vertically to different selected positions to accommodate cartons of different capacities, said apparatus comprising a plurality of liquid dispensing units arranged in a row above the guide rail, each of said units being adapted when operated to dispense a predetermined quantity of liquid into the cartons as they are successively positioned below the units, the total amount of liquid successively dispensed by all of said units being sufficient to fill a carton of certain capacity, power means, a motion transmitting means between said power means and each of said units for operating the latter, a clutch member associated with each motion transmitting means, said clutch members being movable into clutching engagement to connect said motion transmitting means with said units respectively and being movable out of clutching engagement to disconnect said motion transmitting means from said units, and means cooperable to automatically maintain selected ones of said clutches out of clutching engagement at certain selected positions of the guide rail.

35. In apparatus for dispensing liquids including a body member formed with a vertically extending passage, a sleeve slidably mounted in said passage, a stem member extending axially through the sleeve and having a head portion seated against the lower end of the sleeve and forming a closure therefor, means operable to detachably fix said stem in said sleeve against axial movement relative to the sleeve, said sleeve being formed with discharge openings adjacent its lower end, the outer surface of said sleeve and the periphery of said head portion slidably engaging the wall of said vertical passage in liquid tight relation thereto, means for supplying fluid to the interior of the sleeve, and motion transmitting means operable to effect reciprocation of the sleeve to move the lower end portion thereof into and out of said bore to cover and uncover said discharge openings.

36. In apparatus for dispensing liquids including a body member formed with a vertically extending passage, a sleeve slidably mounted in said passage, a stem member extending axially through the sleeve and having a head portion seated against the lower end of the sleeve and forming a closure therefor, means operable to detachably fix said stem in said sleeve against axial movement relative to the sleeve, said sleeve being formed with discharge openings adjacent its lower end, the outer surface of said sleeve and the periphery of said head portion slidably engaging the wall of said vertical passage in liquid tight relation thereto, means for supplying fluid to the interior of the sleeve, and motion transmitting means operable to effect reciprocation of the sleeve to move the lower end portion thereof into and out of said bore to cover and uncover said discharge opening, the end portion of the body encircling the lower end of said passage extending upwardly and outwardly from said passage, and the outer under surface of the head portion of the stem extending upwardly and inwardly from the peripheral edge of the head portion.

ALFRED A. BARNES.
ROBERT SPURR.

References Cited in the file of this patent

UNITED STATES PATENTS

| Number | Name | Date |
|---|---|---|
| 941,268 | Nolley | Nov. 23, 1909 |
| 1,683,120 | Ayers | Sept. 4, 1928 |
| 2,070,841 | Reade et al. | Feb. 16, 1937 |
| 2,162,404 | Kerr | June 13, 1939 |
| 2,172,010 | Kerr | Sept. 5, 1939 |
| 2,197,368 | Minard | Apr. 16, 1940 |
| 2,202,073 | Wollenweber | May 28, 1940 |
| 2,243,463 | Kerr | May 27, 1941 |
| 2,325,419 | Minard | July 27, 1943 |
| 2,388,036 | Bingham | Oct. 30, 1945 |